(12) United States Patent
Olsen et al.

(10) Patent No.: US 11,864,681 B2
(45) Date of Patent: Jan. 9, 2024

(54) DISPOSABLE CURTAIN SYSTEM AND A LOCKABLE QUICK-RELEASE SYSTEM THEREFOR AND METHOD

(71) Applicant: Bannack Medical LLC, Gilbert, AZ (US)

(72) Inventors: Arlen Olsen, Clifton Park, NY (US); Joel Price, Germantown, MD (US); Laurinda Olsen, Clifton Park, NY (US); Joshua Olsen, Logan, UT (US)

(73) Assignee: BANNACK MEDICAL LLC, Gilbert, AZ (US)

( * ) Notice: Subject to any disclaimer, the term of this patent is extended or adjusted under 35 U.S.C. 154(b) by 108 days.

(21) Appl. No.: 17/194,858

(22) Filed: Mar. 8, 2021

(65) Prior Publication Data
US 2022/0279954 A1     Sep. 8, 2022

(51) Int. Cl.
*A47H 15/02* (2006.01)
*A47H 13/04* (2006.01)
*A47H 1/06* (2006.01)
*A47H 1/10* (2006.01)
*A47H 13/00* (2006.01)
(Continued)

(52) U.S. Cl.
CPC ............... *A47H 13/04* (2013.01); *A47H 1/06* (2013.01); *A47H 1/10* (2013.01); *A47H 13/00* (2013.01); *A47H 2001/047* (2013.01); *A47H 2015/005* (2013.01)

(58) Field of Classification Search
CPC .......... A47H 13/04; A47H 1/10; A47H 13/00; A47H 1/06
See application file for complete search history.

(56) References Cited

U.S. PATENT DOCUMENTS

| 168,992 A | 10/1875 | Hart |
| 259,531 A | 6/1882 | Grimm |

(Continued)

FOREIGN PATENT DOCUMENTS

| CH | 657511 A5 | 9/1986 |
| DE | 2216323 A1 | 10/1973 |

(Continued)

OTHER PUBLICATIONS

Notice of Allowance (dated May 3, 2022) for U.S. Appl. No. 16/933,545, filed Jul. 20, 2020.

(Continued)

*Primary Examiner* — Jason W San
(74) *Attorney, Agent, or Firm* — Schmeiser, Olsen & Watts, LLP

(57) ABSTRACT

Disclosed is a disposable curtain system, a hook attachment and a quick-release system therefor and method. The disposable curtain system is for use in health care facilities to maintain a clean environment. The disposable curtain system includes: a hook attachment; an extension, operatively attached to the hook attachment; and a quick-release, operatively attached to the extension and adapted to be attached to a curtain. The quick-release includes; an extension attachment; and a curtain attachment, wherein at least one of the curtain attachment and the extension attachment has a neck and a head and the other of the curtain attachment and the extension attachment has at least one of a cradle or receiver for receiving the head.

14 Claims, 18 Drawing Sheets

(51) Int. Cl.
*A47H 1/04* (2006.01)
*A47H 15/00* (2006.01)

(56) References Cited

U.S. PATENT DOCUMENTS

| | | | |
|---|---|---|---|
| 533,152 A | 1/1895 | Wheat | |
| 588,886 A | 8/1897 | Smith | |
| 699,971 A | 5/1902 | Poschmann | |
| 887,614 A | 5/1908 | Farby | |
| 948,687 A | 2/1910 | Kirkbride | |
| 1,125,749 A | 1/1915 | Smalley | |
| 1,472,766 A | 10/1923 | Fraser | |
| 1,566,402 A | 12/1925 | Hees | |
| 1,581,748 A | 4/1926 | Lund | |
| 1,658,271 A | 2/1928 | Lodge | |
| 1,721,338 A | 7/1929 | Gagnon | |
| 2,045,007 A | 6/1936 | Carpenter | |
| 2,074,928 A | 3/1937 | Miller | |
| 2,320,003 A | 5/1943 | Madan | |
| 2,468,453 A | 4/1949 | Mallentjer | |
| 2,538,755 A | 1/1951 | Bradley | |
| 2,544,516 A | 3/1951 | Walters | |
| 2,594,605 A | 4/1952 | Zoppelt | |
| 2,848,734 A | 8/1958 | Ault | |
| 2,952,315 A | 9/1960 | Brontman | |
| 2,968,205 A * | 1/1961 | Maurice | B64F 5/10 29/441.1 |
| 2,971,213 A | 2/1961 | Johnson | |
| 2,980,946 A | 4/1961 | Del Faro et al. | |
| 3,002,239 A | 10/1961 | Noboru | |
| 3,044,104 A | 7/1962 | Walz | |
| 3,051,318 A | 8/1962 | Murphy | |
| 3,157,907 A | 11/1964 | Stall | |
| 3,175,243 A | 3/1965 | Weber | |
| 3,191,665 A | 6/1965 | Rosenbaum et al. | |
| D208,302 S | 8/1967 | Romano | |
| 3,346,227 A | 10/1967 | Hankin | |
| 3,585,674 A | 6/1971 | Golden | |
| 3,616,486 A * | 11/1971 | Ford et al. | A47H 15/04 16/87.2 |
| 3,638,711 A | 2/1972 | Mazzarelle | |
| 3,645,318 A | 2/1972 | Holzlehner | |
| 3,712,509 A | 1/1973 | Niel | |
| 4,010,503 A | 3/1977 | Denton | |
| 4,091,857 A | 5/1978 | Jacobs et al. | |
| 4,115,899 A | 9/1978 | Ford | |
| 4,125,143 A | 11/1978 | Pape et al. | |
| 4,221,020 A | 9/1980 | Wertepny | |
| 4,282,630 A * | 8/1981 | Toder | A47H 15/04 206/343 |
| 4,288,891 A | 9/1981 | Boden | |
| 4,359,080 A * | 11/1982 | Brydolf | E05D 15/26 160/183 |
| 4,473,102 A | 9/1984 | Ohman et al. | |
| 4,525,893 A | 7/1985 | Fukada | |
| 4,599,763 A | 7/1986 | Toder | |
| 4,606,455 A | 8/1986 | Grikis et al. | |
| 4,675,939 A * | 6/1987 | Fukada | A47H 15/02 16/102 |
| 4,684,022 A | 8/1987 | Potucek | |
| 4,688,620 A | 8/1987 | Lechner et al. | |
| 4,793,399 A | 12/1988 | Pryor | |
| 5,111,867 A | 5/1992 | Horton et al. | |
| 5,159,968 A | 11/1992 | Lawson | |
| 5,193,252 A | 3/1993 | Svehaug | |
| 5,217,057 A * | 6/1993 | Hubbard | A47H 5/032 160/123 |
| D337,516 S | 7/1993 | Williams | |
| 5,282,292 A * | 2/1994 | Levy | A47H 13/06 16/95 D |
| 5,291,632 A | 3/1994 | Akashi | |
| D347,508 S | 5/1994 | Kubota et al. | |
| 5,365,641 A | 11/1994 | Watanabe et al. | |
| 5,379,496 A * | 1/1995 | Krauss | F16G 11/10 24/615 |
| 5,421,059 A | 6/1995 | Leffers, Jr. | |
| 5,518,058 A | 5/1996 | Gastmann | |
| 5,806,141 A | 9/1998 | Kolisch | |
| 5,903,957 A | 5/1999 | Le Manchec | |
| 6,000,456 A | 12/1999 | Neverett | |
| 6,098,699 A | 8/2000 | Junius | |
| 6,126,005 A | 10/2000 | Long, Jr. | |
| 6,131,243 A * | 10/2000 | Lee | E06B 9/36 16/87.2 |
| 6,192,965 B1 * | 2/2001 | Hinds | A47K 3/38 160/DIG. 18 |
| 6,382,297 B1 * | 5/2002 | Takizawa | A44B 18/0049 24/716 |
| 6,564,851 B1 * | 5/2003 | Liao | A47H 13/01 16/87.4 R |
| D475,231 S | 6/2003 | Briles | |
| 6,595,478 B2 | 7/2003 | Lee | |
| 6,654,990 B2 * | 12/2003 | Liu | F16B 45/021 24/598.5 |
| 6,766,849 B1 | 7/2004 | Tseng | |
| 6,938,927 B1 | 9/2005 | Martin et al. | |
| 7,100,661 B1 | 9/2006 | Pittman | |
| D534,415 S | 1/2007 | Salice | |
| 7,370,839 B2 | 5/2008 | Putman | |
| 7,377,011 B2 | 5/2008 | Sakakura | |
| 7,451,801 B2 | 11/2008 | Park et al. | |
| 7,757,347 B1 | 7/2010 | Wicker | |
| 7,788,769 B2 | 9/2010 | Wicker et al. | |
| D633,373 S | 3/2011 | Grenade | |
| D654,347 S | 2/2012 | Chen | |
| D654,349 S | 2/2012 | Schopf | |
| 8,205,316 B2 | 6/2012 | Chu | |
| 8,307,499 B2 | 11/2012 | Ruffo et al. | |
| D671,783 S * | 12/2012 | Graneto, III | D6/580 |
| D678,042 S | 3/2013 | Jacobson | |
| 8,397,346 B2 | 3/2013 | Peters et al. | |
| 8,479,800 B2 | 7/2013 | Graneto, III et al. | |
| D709,714 S * | 7/2014 | Graneto, III | D6/580 |
| 8,869,869 B2 * | 10/2014 | Graneto, III | A47H 13/01 160/340 |
| 8,899,301 B2 | 12/2014 | Graneto, III | |
| 8,904,605 B2 | 12/2014 | Kawaguchi | |
| D737,126 S | 8/2015 | Tschan | |
| 9,125,509 B2 | 9/2015 | Graneto, III | |
| 9,125,511 B2 | 9/2015 | Kao et al. | |
| 9,149,144 B2 | 10/2015 | Graneto, III | |
| 9,204,749 B1 | 12/2015 | Trapani | |
| D748,753 S | 2/2016 | Chow et al. | |
| 9,480,357 B2 | 11/2016 | Price et al. | |
| 9,578,995 B2 | 2/2017 | Hanley | |
| 9,585,508 B2 | 3/2017 | Graneto, III | |
| 9,717,362 B1 | 8/2017 | Birch | |
| 9,742,138 B2 | 8/2017 | Garske et al. | |
| D807,735 S | 1/2018 | Nimgulkar et al. | |
| D819,294 S | 5/2018 | Frazier et al. | |
| D823,710 S | 7/2018 | Schone et al. | |
| D836,561 S | 12/2018 | Hung | |
| 10,308,425 B2 | 6/2019 | Corvisier | |
| 10,398,248 B1 | 9/2019 | Burch, Jr. | |
| D893,286 S | 8/2020 | Xu | |
| 10,758,072 B2 | 9/2020 | Hatton et al. | |
| 10,945,548 B2 * | 3/2021 | Wexler | A47H 1/14 |
| 10,952,558 B2 * | 3/2021 | Choi | A47H 1/04 |
| D918,017 S | 5/2021 | Park | |
| 11,122,867 B1 | 9/2021 | Ajaj et al. | |
| 11,191,383 B1 | 12/2021 | Hatton et al. | |
| 11,297,966 B2 | 4/2022 | Alonso | |
| 11,297,968 B2 | 4/2022 | Ko | |
| D953,149 S | 5/2022 | Ormsbee | |
| D954,536 S | 6/2022 | Momin et al. | |
| D962,751 S * | 9/2022 | Olsen | D8/369 |
| D962,752 S * | 9/2022 | Olsen | D8/369 |
| D962,753 S | 9/2022 | Olsen et al. | |
| D963,462 S | 9/2022 | Latal et al. | |
| 11,432,672 B2 | 9/2022 | Olsen et al. | |
| D965,416 S | 10/2022 | Powell | |
| D966,075 S | 10/2022 | Jones et al. | |
| D967,699 S | 10/2022 | Padilla | |
| D982,422 S * | 4/2023 | Olsen | D8/369 |

(56) References Cited

U.S. PATENT DOCUMENTS

| | | | |
|---|---|---|---|
| 2003/0121621 A1 | 7/2003 | Killo et al. | |
| 2006/0001254 A1 | 1/2006 | Malone | |
| 2006/0260769 A1* | 11/2006 | Nien | A47H 1/00 160/330 |
| 2007/0012346 A1 | 1/2007 | Choi | |
| 2007/0157505 A1 | 7/2007 | Dodge | |
| 2008/0041538 A1 | 2/2008 | Granger | |
| 2009/0094798 A1 | 4/2009 | Yao | |
| 2009/0288785 A1 | 11/2009 | Graneto, III | |
| 2009/0288786 A1* | 11/2009 | Graneto, III | A47H 15/02 160/344 |
| 2010/0139873 A1 | 6/2010 | Gardner | |
| 2011/0000631 A1 | 1/2011 | Coles | |
| 2011/0061819 A1* | 3/2011 | Elinson | A47H 15/02 160/196.1 |
| 2011/0283479 A1* | 11/2011 | Peters | A47H 5/14 29/428 |
| 2011/0290966 A1 | 12/2011 | Ota | |
| 2012/0018106 A1* | 1/2012 | Robledo | A47H 1/04 160/330 |
| 2012/0145860 A1* | 6/2012 | Ruffo | A47H 15/02 160/368.1 |
| 2013/0047331 A1 | 2/2013 | Parker et al. | |
| 2014/0284005 A1 | 9/2014 | Kao et al. | |
| 2015/0113769 A1 | 4/2015 | Yu | |
| 2015/0129141 A1 | 5/2015 | Kao et al. | |
| 2015/0136340 A1 | 5/2015 | Graneto, III | |
| 2015/0208843 A1 | 7/2015 | Ruble et al. | |
| 2016/0037953 A1* | 2/2016 | Price | A47H 1/04 160/341 |
| 2016/0374496 A1* | 12/2016 | Marcinik | A47H 15/02 160/331 |
| 2017/0208981 A1 | 7/2017 | Nir et al. | |
| 2017/0273492 A1* | 9/2017 | Hatton | A47H 13/04 |
| 2018/0020860 A1 | 1/2018 | Thomas | |
| 2018/0279818 A1* | 10/2018 | Goelst | A47H 13/01 |
| 2020/0288896 A1 | 9/2020 | Darnes | |
| 2020/0383510 A1 | 12/2020 | Ko | |
| 2022/0015564 A1 | 1/2022 | Olsen et al. | |
| 2022/0015565 A1* | 1/2022 | Olsen | A47H 13/04 |
| 2022/0015566 A1 | 1/2022 | Olsen | |
| 2022/0015567 A1* | 1/2022 | Olsen | A47H 15/02 |
| 2022/0240707 A1 | 8/2022 | Roberts et al. | |
| 2022/0265078 A1 | 8/2022 | Hsu et al. | |
| 2022/0279954 A1 | 9/2022 | Olsen et al. | |

FOREIGN PATENT DOCUMENTS

| | | |
|---|---|---|
| EP | 2428142 A2 | 3/2012 |
| EP | 3308680 A2 | 4/2018 |
| EP | 3909477 A1 | 11/2021 |
| GB | 2031716 A | 4/1980 |
| GB | 2358123 A | 7/2001 |
| GB | 2385511 A | 8/2003 |
| GB | 2477849 A | 8/2011 |
| GB | 2457075 B | 10/2011 |
| GB | 2489485 A | 10/2012 |
| GB | 2493773 A | 2/2013 |
| KR | 101895219 B1 | 2/1910 |
| TW | M587965 U | 12/2019 |

OTHER PUBLICATIONS

Notice of Allowance (dated May 2, 2022) for U.S. Appl. No. 29/755,246, filed Oct. 19, 2020.
Notice of Allowance (dated May 12, 2022) for U.S. Appl. No. 29/755,256, filed Oct. 19, 2020.
Notice of Allowance (dated May 2, 2022) for U.S. Appl. No. 29/755,257, filed Oct. 19, 2020.
PCT International Search Report & Written Opinion dated Jan. 5, 2022 corresponding to PCT International Application No. PCT/US2021/046604.
PCT International Search Report & Written Opinion dated Jan. 27, 2022 corresponding to PCT International Application No. PCT/US21/55740.
Office Action (dated Nov. 9, 2021) for U.S. Appl. No. 16/933,545, filed Jul. 20, 2020.
Notice of Allowance (dated Feb. 4, 2022) for U.S. Appl. No. 16/933,545, filed Jul. 20, 2020.
Notice of Allowance (dated Mar. 9, 2022) for U.S. Appl. No. 29/755,246, filed Oct. 19, 2020.
Notice of Allowance (dated Mar. 9, 2022) for U.S. Appl. No. 29/755,256, filed Oct. 19, 2020.
Notice of Allowance (dated Mar. 9, 2022) for U.S. Appl. No. 29/755,257, filed Oct. 19, 2020.
Restriction Requirement (dated Aug. 5, 2022) for U.S. Appl. No. 17/004,625, filed Aug. 7, 2020.
Office Action (dated Oct. 28, 2022) for U.S. Appl. No. 17/004,625, filed Aug. 7, 2020.
Restriction Requirement (dated Sep. 6, 2022) for U.S. Appl. No. 17/011,571, filed Sep. 3, 2020.
Restriction Requirement (dated Sep. 13, 2022) for U.S. Appl. No. 17/074,861, filed Oct. 20, 2020.
Restriction Requirement (dated Sep. 13, 2022) for U.S. Appl. No. 17/225,321, filed Apr. 8, 2021.
InControl—SmartGuard Disposable Privacy Curtains; ttp://globalmedics.co.nz/media//InControl_SmartGuard_Brochure_2.pdf. 12 Pages.
Marlux Disposable Hospital Curtains: https://www.marluxmedical.com/disposable-curtains. 8 pages.
Opal Health Disposible Curtains Quick Fit System, May 26, 2017. https://www.youtube.com/watch?v=XsQnyL-REhY.
Opalhealth: The Fast, hygienic alternative to traditional curtains. https://opalhealth.co.uk/benefits/. 4 pages.
Solent Blinds & Curtains: Disposable Curtains: https://solentblinds.co.uk/commercial/products/disposable-curtains/. 1 page.
EasyClick: "The Next Generation of Disposable Curtains". https://behrens.co.uk/product/easyclick-the-next-generation-of-disposable-curtains/. 2 pages.
Installing Locking Button in Telescoping Tube, Jul. 29, 2014. https://www.youtube.com/watch?v=y3V603eca0g.
Halder: Ball Lock Pins self-locking, with T-handle. https://www.halder.com/eng/Products/Standard-Parts/Machine-and-Fixture-Elements/Ball-Lock-Pins/Ball-Lock-Pins-self-locking-with-T-handle. 2 pages.
Rapid Refresh Shower Curtains. https://www.icpmedical.com/docs/product-sheets/Shower-Curtains-RR.pdf. 1 page.
ICP Medical: Privacy Curtains: https://icpmedical.com/docs/product-sheets/Privacy-Curtains-RR.pdf. 2 pages.
EasyClick Disposable Cubicle Curtains. https://behrens.co.uk/media/EASYCLICK-advert.jpg; 1 page.
EasyKlip Instructions. Retrieved from https://www.curtain-tracks.com/610-easyklip-mini-tarp-clip-10-per-pack.html. 1 page.
EasyKlip Midi Tarp & Banner Clip. https://www.curtain-tracks.com/610-easyklip-mini-tarp-clip-10-per-pack.html. 2 pages.
"Halder Ball Lock Pins", Oct. 23, 2017. https://youtu.be/qLTZiNngk9c.
ICP Medical: Privacy Curtains: https://www.icpmedical.com/Products/Privacy-Curtains. 2 pages.
"Installing the ICP Medical Rapid Refresh Privacy Curtain", Jun. 10, 2014. https://www.youtube.com/embed/azsr7bpMB5U?autoplay=1.
"Installing the ICP Medical Rapid Refresh Curtain Rods", Jun. 10, 2014. https://www.youtube.com/embed/lohmn8UhiRo?autoplay=1.
Hasan, Afzal. Patentability Search Report for Disposable Curtain System, dated Jul. 6, 2020.
Restriction Requirement (dated Dec. 28, 2022) for PCT International Application No. PCT/US22/46934—International Filing Date Oct. 18, 2022.
Final Office Action (dated Feb. 21, 2023) for U.S. Appl. No. 17/004,625, filed Aug. 7, 2020.
Office Action (dated Dec. 27, 2022) for U.S. Appl. No. 17/074,861, filed Oct. 20, 2020.
Office Action (dated Dec. 27, 2022) for U.S. Appl. No. 17/225,321, filed Apr. 8, 2021.

(56) References Cited

OTHER PUBLICATIONS

Office Action (dated Feb. 14, 2023) for U.S. Appl. No. 29/778,588, filed Apr. 14, 2021.
Final Office Action (dated Jul. 6, 2023) for U.S. Appl. No. 17/074,861, filed Oct. 20, 2020.
Final Office Action (dated Jun. 5, 2023) for U.S. Appl. No. 17/225,321, filed Apr. 8, 2021.
PCT International Preliminary Report on Patentability dated Feb. 28, 2023 corresponding to PCT International Application No. PCT/US2021/046604.
Advisory Action (dated May 2, 2023) for U.S. Appl. No. 17/004,625, filed Aug. 7, 2020.
Office Action (dated Apr. 11, 2023) for U.S. Appl. No. 29/778,596, filed Apr. 14, 2021.
Office Action (dated Apr. 11, 2023) for U.S. Appl. No. 29/778,603, filed Apr. 14, 2021.
Restriction Requirement (dated Apr. 11, 2023) for U.S. Appl. No. 29/778,609, filed Apr. 14, 2021.
Restriction Requirement (dated Apr. 11, 2023) for U.S. Appl. No. 29/778,614, filed Apr. 14, 2021.
Final Office Action (dated May 4, 2023) for U.S. Appl. No. 17/011,571, filed Sep. 3, 2020.
Office Action (dated Nov. 28, 2022) for U.S. Appl. No. 17/011,571, filed Sep. 3, 2020.
Notice of Allowance (dated Nov. 17, 2022) for U.S. Appl. No. 29/755,249, filed Oct. 19, 2020.

\* cited by examiner

DISPOSABLE CURTAIN SYSTEM AND A LOCKABLE QUICK-RELEASE SYSTEM THEREFOR AND METHOD

CROSS-REFERENCE TO RELATED APPLICATIONS

This application is related to U.S. application Ser. No. 17/011,571 filed on Sep. 3, 2020; U.S. application Ser. No. 17/004,625 filed on Aug. 27, 2020; and U.S. application Ser. No. 16/933,545 filed on Jul. 20, 2020 which all disclosures are hereby incorporated by reference in their entireties.

FIELD OF THE INVENTION

Disclosed is a disposable curtain system, components therefor and method. In particular, is a disposable curtain system having a lockable quick-release system, most often, for use in health care facilities to maintain a clean environment.

BACKGROUND

Health care facilities, such as hospitals, nursing homes, doctor's offices, urgent care facilities, and long-term care facilities are becoming more and more concerned with infectious diseases being present. The COVID-19 pandemic is one major infectious disease that has brought attention to the public by the media to the concerns of cleanliness of health care facilities and other public spaces. In addition to COVID-19 are other infections diseases such as bacterial infection diseases like Anthrax, bacterial botulism, brucellosis, cholera, diphtheria, Lyme's disease, tuberculosis; fungal infectious diseases like aspergillosis, blastomycosis, candidiasis, cryptococcosis, histoplasmosis; parasitic infectious diseases like ascariasis, cryptosporidiosis, giardiasis, malaria, scabies; prion infectious diseases like Alper's syndrome, Creutzfeldt-Jakob disease, kuru; and viral infectious diseases like COVID-19, AIDS, chickenpox, Common Cold, Ebola, herpes, Influenza, mumps, rabies, rubella, viral meningitis, yellow fever and many more.

One location in the hospital that has a concern with infectious disease are the privacy curtains in locations such as the Emergency Room ("ER") and Intensive Care Unit ("ICU"). Medical personnel will take many precautions such as washing hands, wearing gloves and wearing personal protection equipment. However, while wearing gloves they will grab the curtains with their gloved hands which may leave infectious diseases on the curtains due to contact with bodily fluids such as blood, saliva, urine, mucous, phlegm, etc. In addition, patients which are surrounded by the curtain systems will cough, sneeze or perform other bodily functions which expel airborne liquids into the air surrounding their bed or private space.

Curtain systems for hospitals are generally attached to the ceiling. The curtains systems have a track which is affixed to the ceiling. Within the track are rollers with hooks. The curtains attach to the hooks.

A difficulty with this system is that the tracks and hooks are attached to ceilings that can be from 7 to 12 feet above the ceiling. This requires maintenance personnel at the hospital to use ladders or other stools to replace the curtains.

A further difficulty is when replacing the curtain system, the roller hooks in the track many times need to be crimped causing repetitive problems with the installer having problems with muscles and tendons due to repetitive installation of the curtains on the hooks.

Another difficulty is that the most curtain systems are not easily and quickly disassembled and require personnel to remove the curtains one hook at a time.

In the past, curtain systems required keyways such as shown in U.S. Pat. No. 9,585,508.

SUMMARY

Disclosed is a disposable curtain system, attachment therefor and method.

An advantage is the ability to quickly attach a disposable curtain system to hooks on a pre-existing or installed curtain system.

Another advantage is once installed, there will be no or minimal need for health care personnel to climb on ladders or stools to reach the hooks for replacement of the curtains.

Another advantage is that health care personnel will not need to crimp the hooks.

Another advantage is removal and disposal and or recycling of the curtains on a regular basis.

Another advantage is that the quick release and lock system may be usable by an installer/disassembler at approximately a height of 6-7 feet for easy installation and removal, it will have disposable curtain attachments that quickly attach and detach with a single or small number or movements during installation and disassembly.

An advantage is that the disclosed embodiments do not require a keyway or turning mechanism for installation of disposable hospital curtains as in the relevant art.

An advantage is that the disposable curtain system may be held in a receiver or cradle by gravity and it does not require a latch or lock mechanism.

An advantage is that the disposable curtain system has a quick-release having a lockable quick release with a housing with an opening therein into which a head may be inserted and dropped down. The motion makes accidental removal of the head from the opening and cradle or receiver more difficult.

Another advantage is that the head is inserted into the quick-release housing in a first direction which is perpendicular or angular to the direction that the curtains are pulled, thus alleviating accidental removal of the curtain from the curtain system.

Accordingly, various embodiments of the invention disclosed include: A disposable curtain system comprising: a quick-release, adapted to be attached to a curtain, wherein the quick-release includes: a cradle or receiver; a curtain attachment, wherein the curtain attachment has a neck and a head; and a locking mechanism, wherein the locking mechanism is located on the cradle or receiver such that when at least one of the neck and head is inserted into the cradle or receiver, the locking mechanism may be locked.

Accordingly, various embodiments of the invention disclosed include: A hook attachment for use with a disposable curtain system comprising: a housing, said housing including: a first opening defined therein and shaped for attaching a hook therethrough; and a second opening defined therein and shaped for attaching a curtain or curtain extension, wherein a lower portion of said first opening intersects with an upper portion of said second opening such that the weight of at least one of the curtain and extension may be supported by the hook within the housing.

Accordingly, various components of the invention disclosed include: A quick-release system for use with a disposable curtain system comprising: a cradle or receiver; a curtain attachment having an insert for cooperating with the cradle or receiver; and a sliding locking mechanism, wherein the locking mechanism is located on the cradle or receiver attachment for locking the insert into the cradle or receiver.

Accordingly, various components of the invention disclosed include: A method for attaching a disposable curtain system comprising: providing a hook attachment; providing an extension, operatively attached to the hook attachment; providing a quick-release, having an extension attachment operatively attached to the extension; attaching a curtain attachment of the quick-release to the curtain, wherein at least one of the curtain attachment and the extension attachment has a neck and a head and the other of the curtain attachment and the extension attachment has at least one of a cradle or receiver for receiving the head; inserting the head into an opening in the second portion of the quick-release and allowing the head to drop into the cradle or receiver; and locking the head within the at least one of a cradle or receiver, wherein a locking mechanism is configured to move a lever to cover the opening of the at least one of a cradle or receiver.

BRIEF DESCRIPTION

Some of the embodiments will be described in detail, with reference to the following figures, wherein like designations denote like members, wherein.

DETAILED DESCRIPTION

Figure 1:
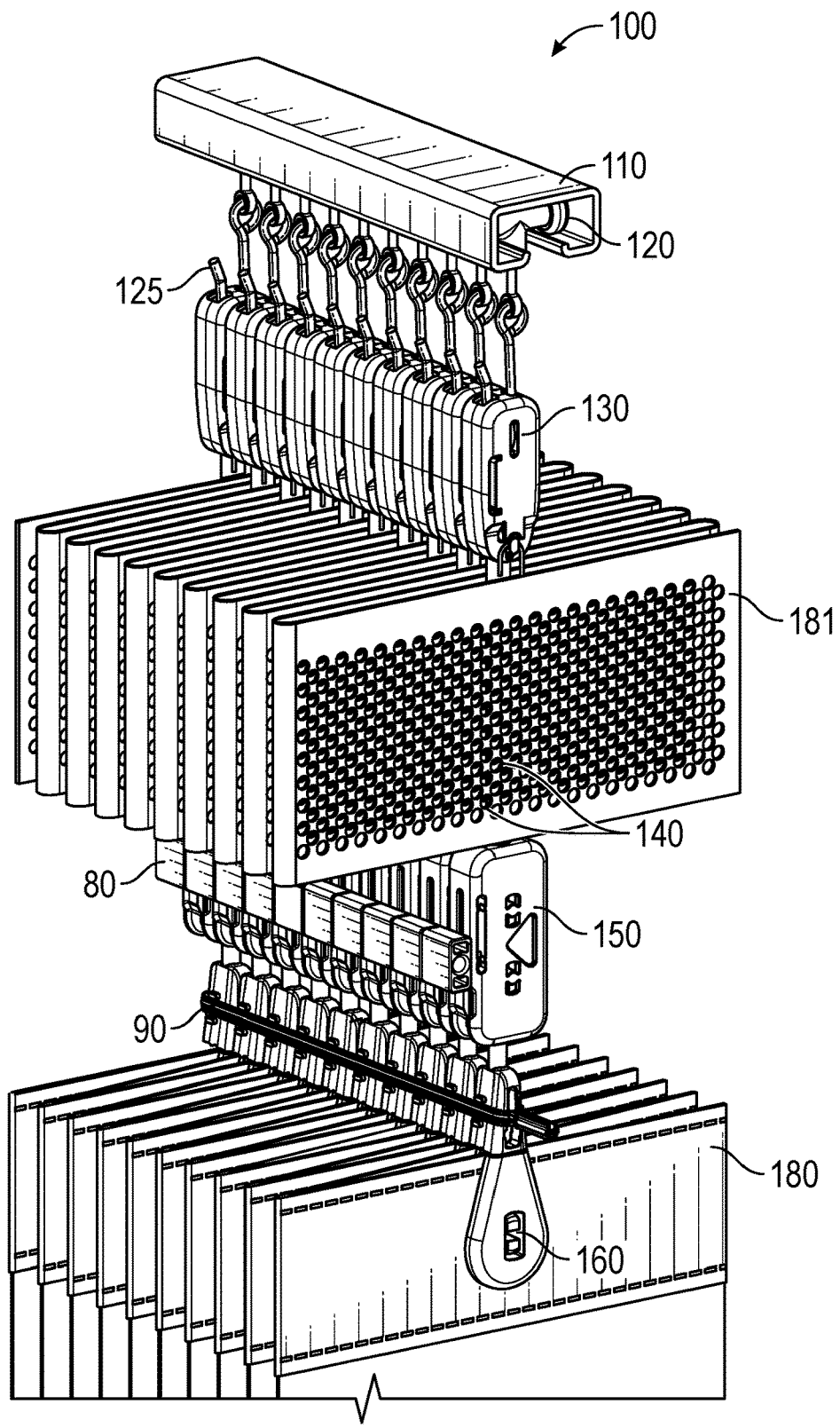
FIG. 1 shows a curtain system according to an embodiment of the invention.

Disclosed are various embodiments of the inventions. Referring to FIG. 1 is a disposable curtain system 100. The disposable curtain system 100 is attached to the ceiling by a track 110. The track may be attached directly to the ceiling or hang from the ceiling on extensions. Running through the track 110 are roller hooks 120. The roller hooks 120 have a hook 125 on the end thereof for attaching an extension or elongate member 140. So that the extension does not come off the hook 125, a cover 130 for the hook 125 is provided.

The extension 140 may be telescoping poles, poles that may be discreet sizes and interchanged depending on size needed, straps which may include a buckle that may be adjusted for size or the strap may be cut, a string, cable or wire that may be adjusted or cut. Since the extension will remain in place it is important that is easily cleanable for infectious diseases with an extension pole that has disinfectant. The material of the extension should not absorb liquids but should be made from a nonabsorbent plastic such as polyvinyl, acrylic, polyacrylic, nylon, carbon composite, PVC, polyethylene or the like.

The curtain 180 comes in discreet sections, such as 6-12 feet and most commonly 9 feet. The curtain discreet sections of 9-12 feet may be snapped together with snaps so as to make longer curtains. The curtains are made from disposable recyclable material such as polypropylene. The curtains 180 may be attached to the extension 140 with a quick-release mechanism 150 and a curtain attachment assembly or curtain attachment 160. The quick-release mechanism 150 may also be referred to interchangeably as the cradle, receiver, quick-release, body, housing and quick release body 150. The curtain attachment has a locking mechanism 80. The curtain attachment 160 during shipping and the initial assembly may be held together with a zip-tie, twist tie 90 or a holder such as 500 shown in FIGS. 26 and 27. Optionally, a second curtain or mesh 181 may be used with the extension and attached to the hood attachment or by other means.

Figure 2:
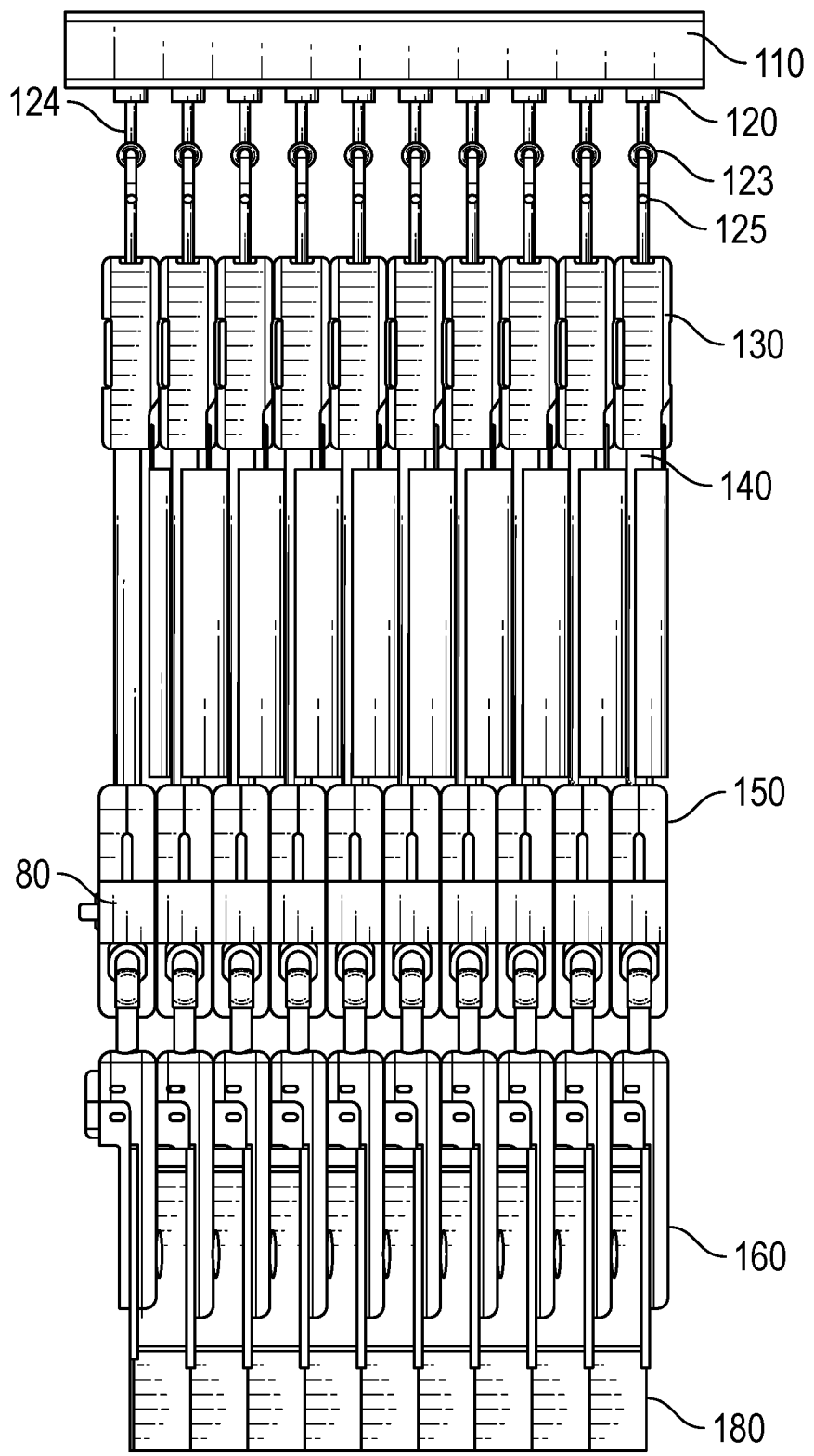
FIG. 2 shows a front view of a curtain system according to an embodiment of the invention.

Referring to FIG. 2, a track 110 is shown. The track is bolted, screwed, glued or otherwise attached to the ceiling. The track may also be on a hanging system and hang from the ceiling. The track 110 has an end piece (not shown) with snap connectors for the end piece. Running inside the track are roller hooks 120 having rollers. Additionally, other types of arrangements other than rollers 120 may be used so long as the slide easily along the track guides 118. Extending from the rollers are an eyelet 123 to which the eyelet of the hook 124 is attached. Other arrangements may be envisioned such as chains and other extenders for the roller hook.

Figure 24:
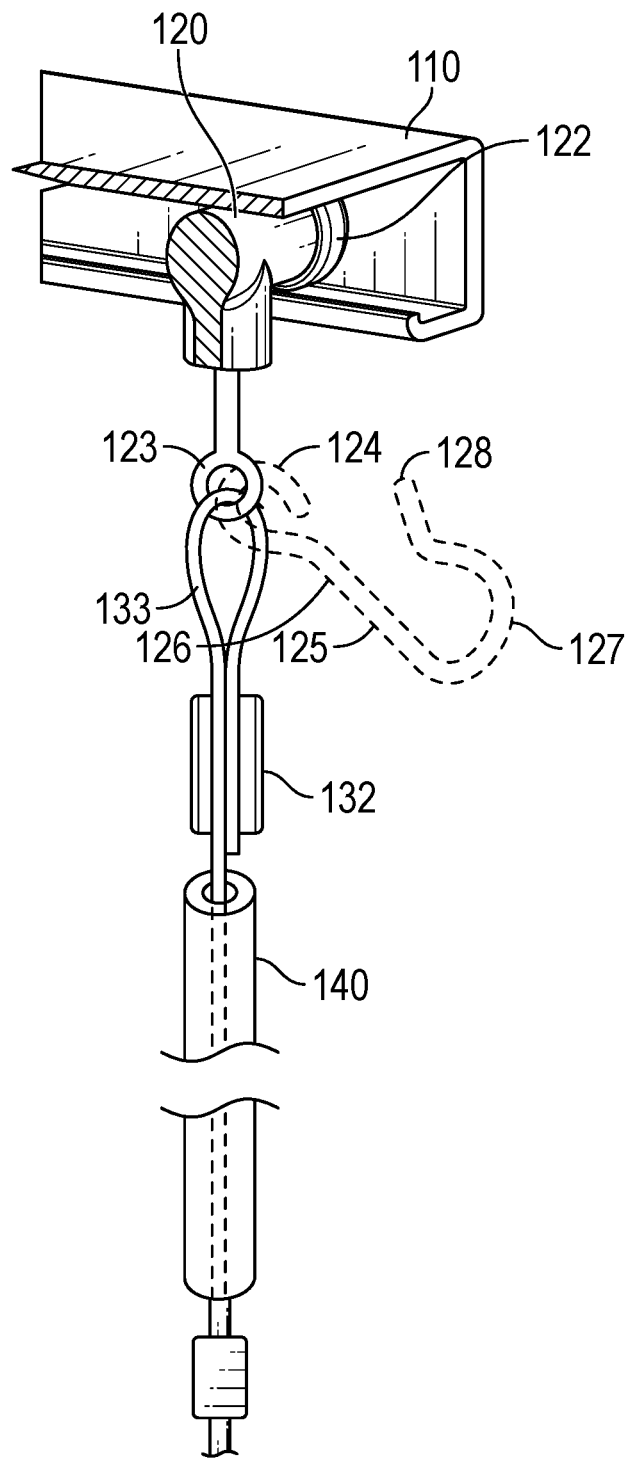
FIG. 24 shows an embodiment of attaching a roller to an extension.
Figure 25A:
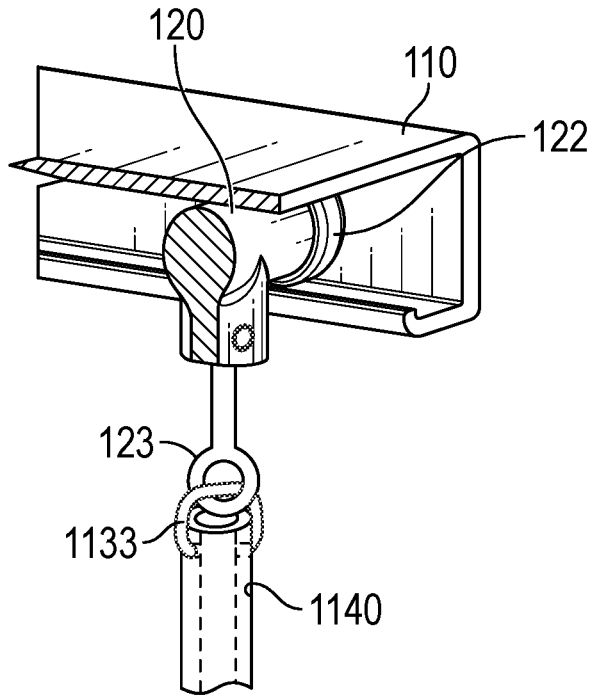
FIG. 25a shows another embodiment of attaching a roller to an extension.
Figure 25B:
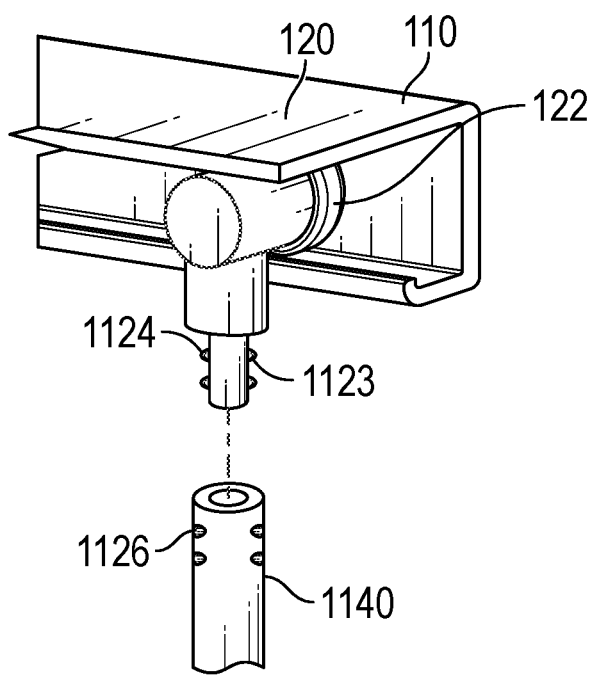
FIG. 25b shows still another embodiment of attaching a roller to an extension.

Over each hook, a covering 130 is affixed for quickly attaching the attachment 130 to the hook 125. FIG. 2 shows a quick-release 150, locking mechanism 80 and curtain attachment 160 all for attaching the disposable curtains 180. Rather than hook attachments, alternative embodiments may be used for attaching the extension 140 to the rollers 120 such as shown in FIGS. 24, 25 and 25a.

Figure 3:
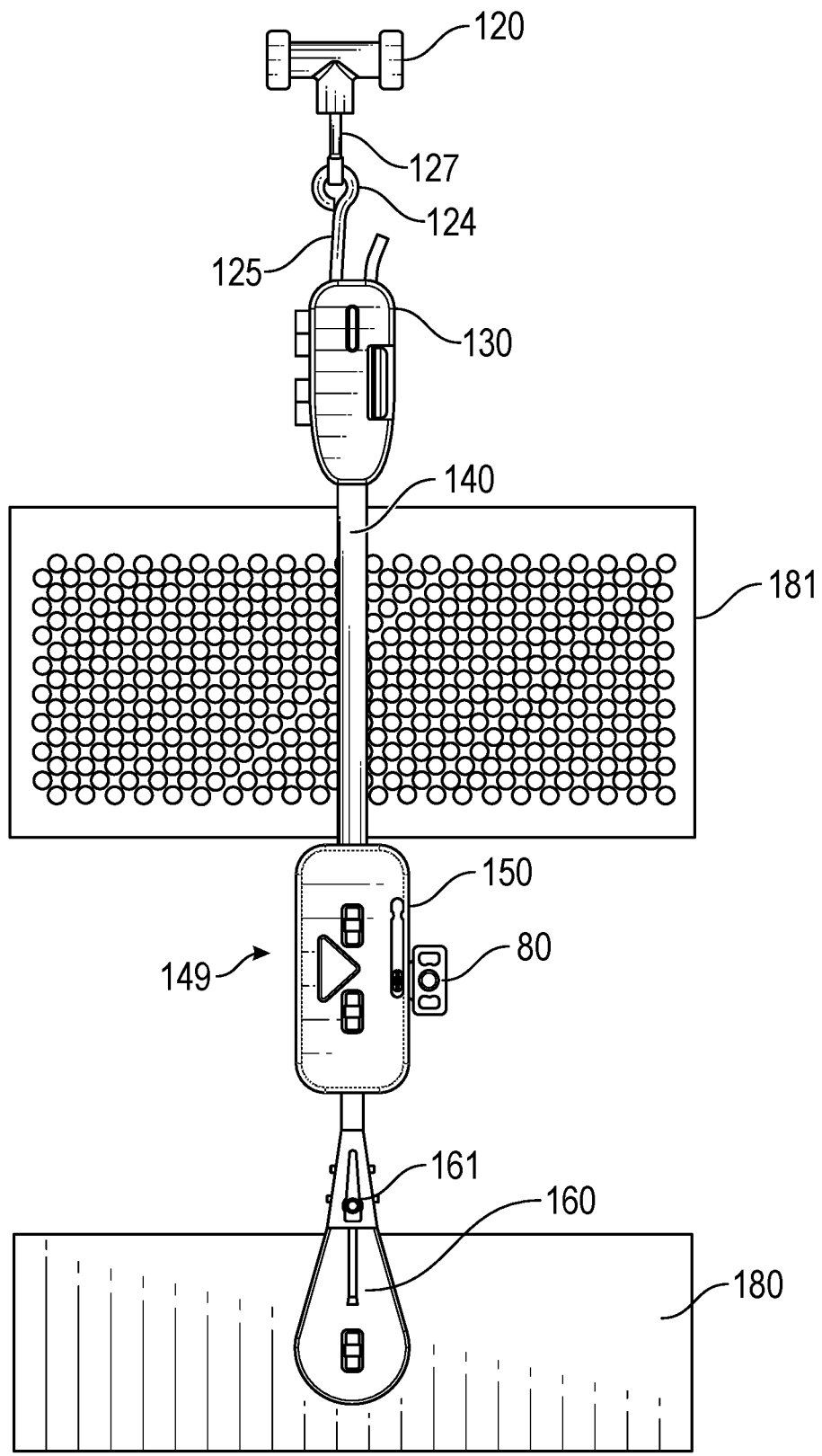
FIG. 3 shows a side view of a curtain system according to an embodiment of the invention.
Figure 4:
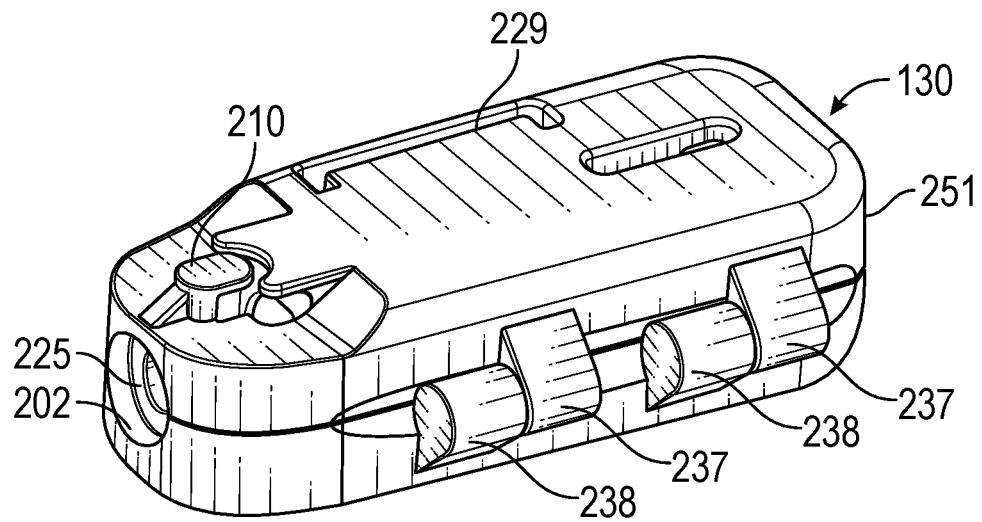
FIG. 4 shows a bottom and side perspective view of a hook attachment according to an embodiment of the invention.
Figure 5:
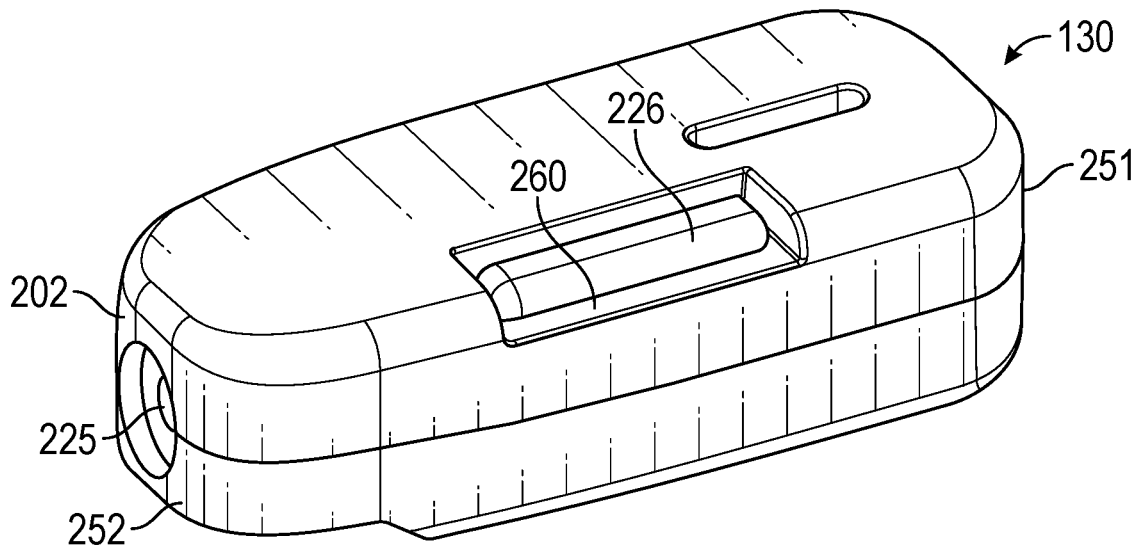
FIG. 5 shows a top and side perspective view of a hook attachment according to an embodiment of the invention.
Figure 10:
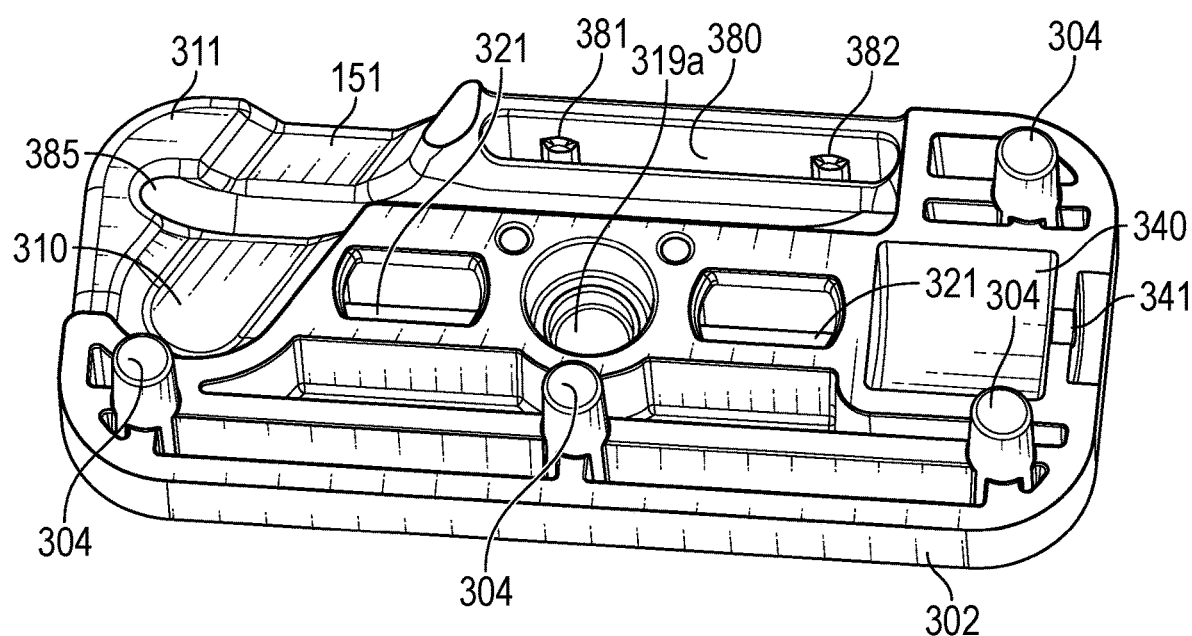
FIG. 10 shows a first side of the inside of a quick release system according to an embodiment of the invention.
Figure 11:
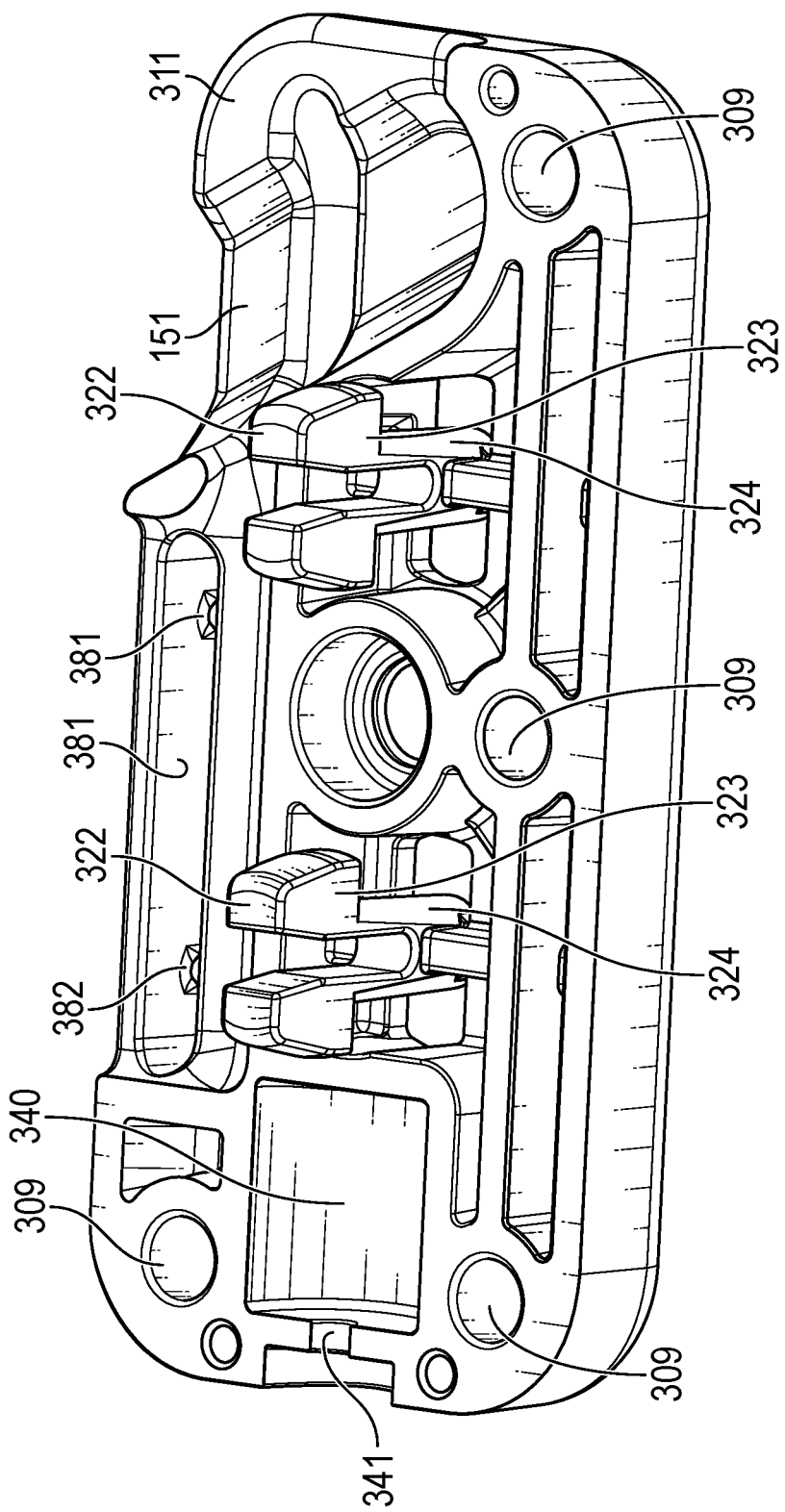
FIG. 11 shows a second side of the inside of a quick release system according to an embodiment of the invention.
Figure 20:
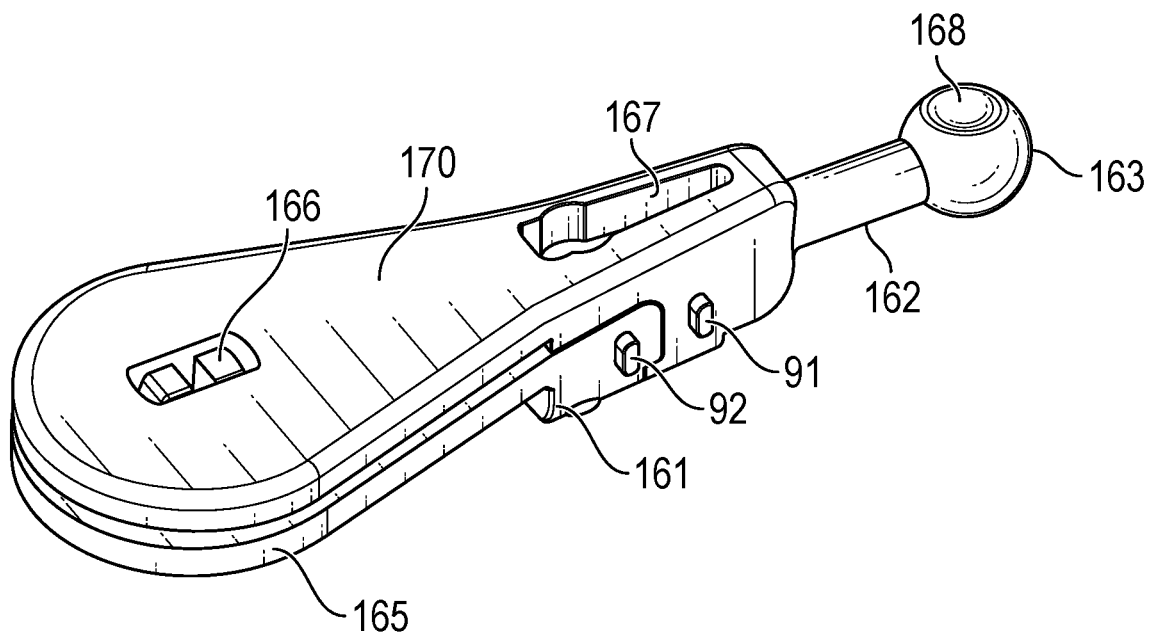
FIG. 20 shows a perspective view of a curtain attachment.

Referring to FIG. 3 is the quick-release curtain attachment 149 having a body 150 and a locking mechanism 80. The curtain attachment 160 has an alignment member 161 for alignment with other curtain attachments 160. An advantage of the curtain attachments 160 is that they can align and be held together using the alignment members 161 which insert in a receiving member (not shown see 167 in FIG. 20). In this manner all the curtain holders 160 may be simultaneously inserted into the channels 151 as shown in FIGS. 10 and 11. The curtain holders, extension holder and hook attachment are all made using injection molded parts using materials such as thermoplastic or thermosetting polymers, elastomers or metals. Common polymers like epoxy and phenolic are examples of thermosetting plastics which nylon, polyethylene and polystyrene are thermoplastic.

Referring to FIGS. 4-7 is a hook attachment system or hook attachment 130. The hook attachment 130 includes a top side 251 and a lower side 252. A nob 210 is used for attaching a curtain proximate the hook 125. The hook attachment 130 includes a hinge assembly 238, 237. The lower side 252 has a hole 225 and stepped portion 202 for receiving the extension 140. On opening 229 is shown for movement of a snap fit or latch 226 (See FIG. 5) for attachment to a ledge 260.

Figure 6:
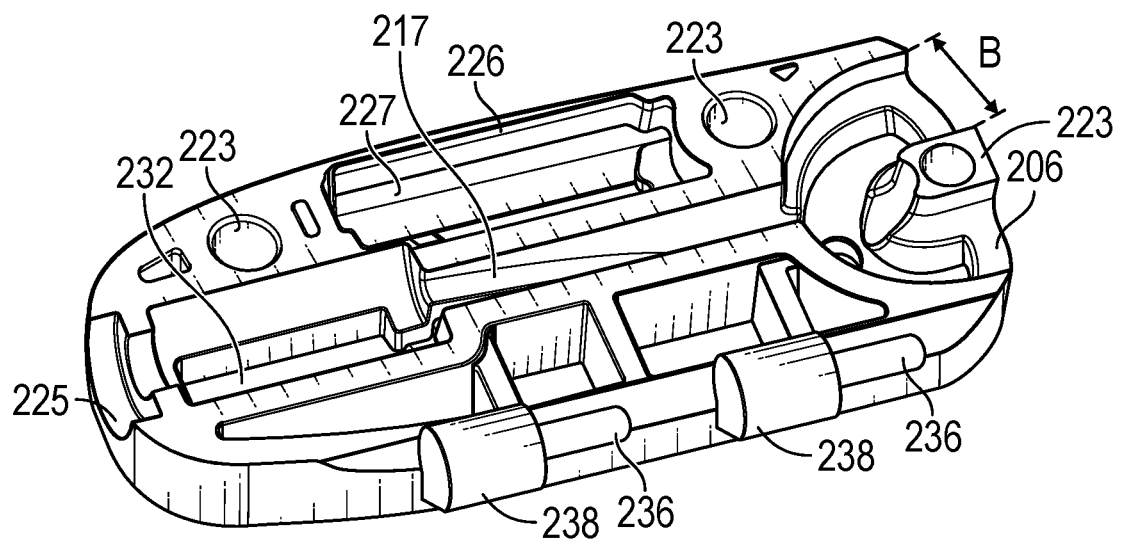
FIG. 6 shows a first side of the inside of a hook attachment according to an embodiment of the invention.
Figure 7:
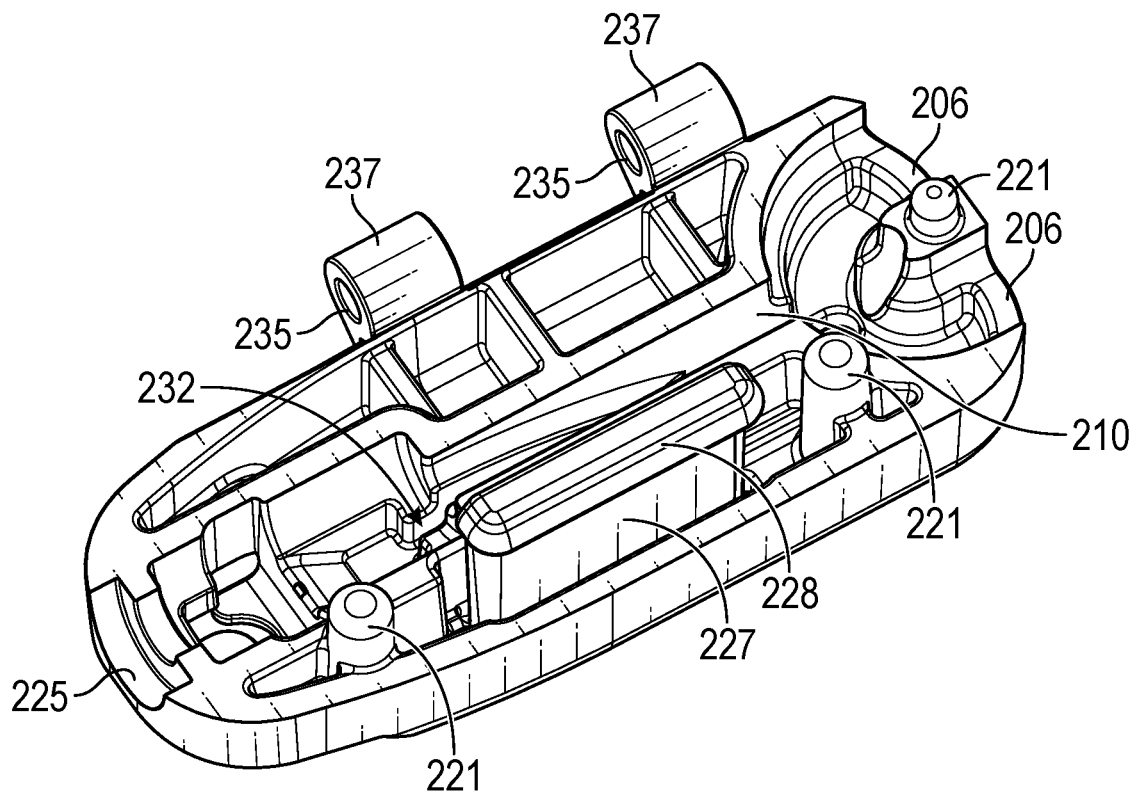
FIG. 7 shows a second side of the inside of a hook attachment according to an embodiment of the invention.

FIGS. 6 and 7 show the inside of a first side and second side of the hook attachment system or hook attachment 130. The latch 228 has a face 227. Receiving holes 223 are show for receiving pegs or alignment devices 221. A cavity 232 may be used for receiving a swaged attachment such as shown at 132 in FIG. 132. The cable 133 may be inserted through the channel 217. A hook 125 may be inserted through the semi-circular channel 206. The channel is designed such that the hook 125 may have a wide range of freedom of movement of β also the distance β serves the purpose that the hook attachment 130 may be useable with various sizes of hooks. Not all roller hooks 125 are of the same dimensions, thus compensation needs to be made for wide and narrow hooks 125. Shown are hinge pegs 236 on hinges 238, which are inserted into holes 235 in FIG. 7.

Figure 8:
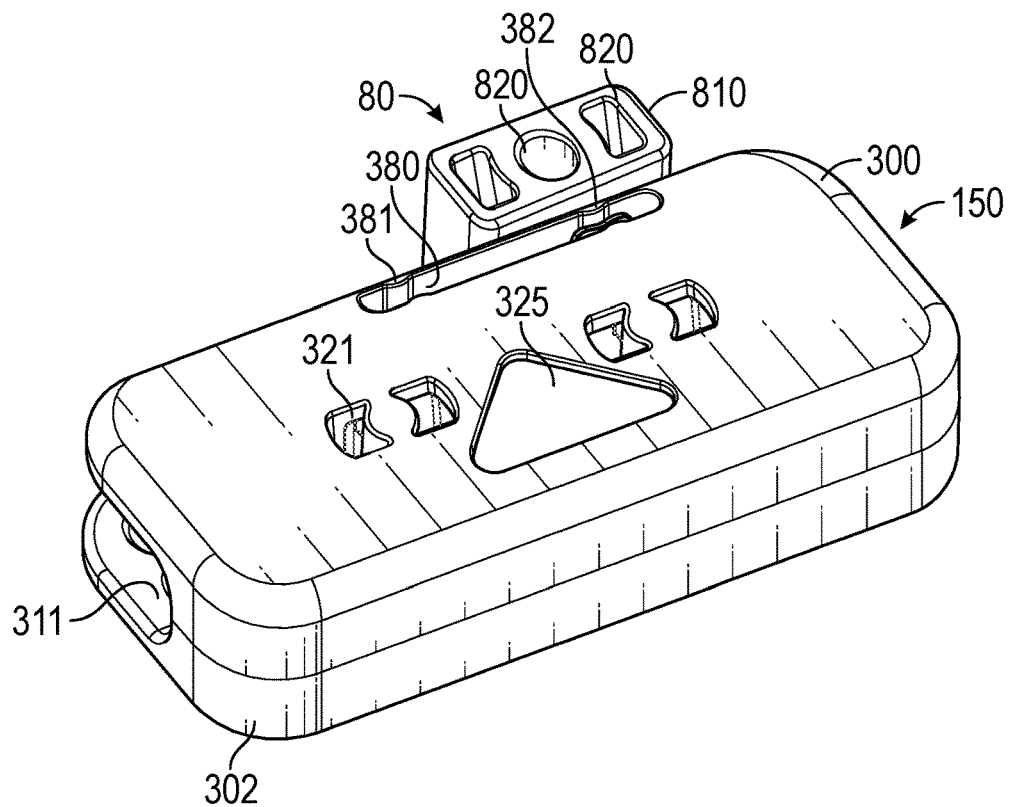
FIG. 8 shows a first perspective view of a quick release system according to an embodiment of the invention.
Figure 21:
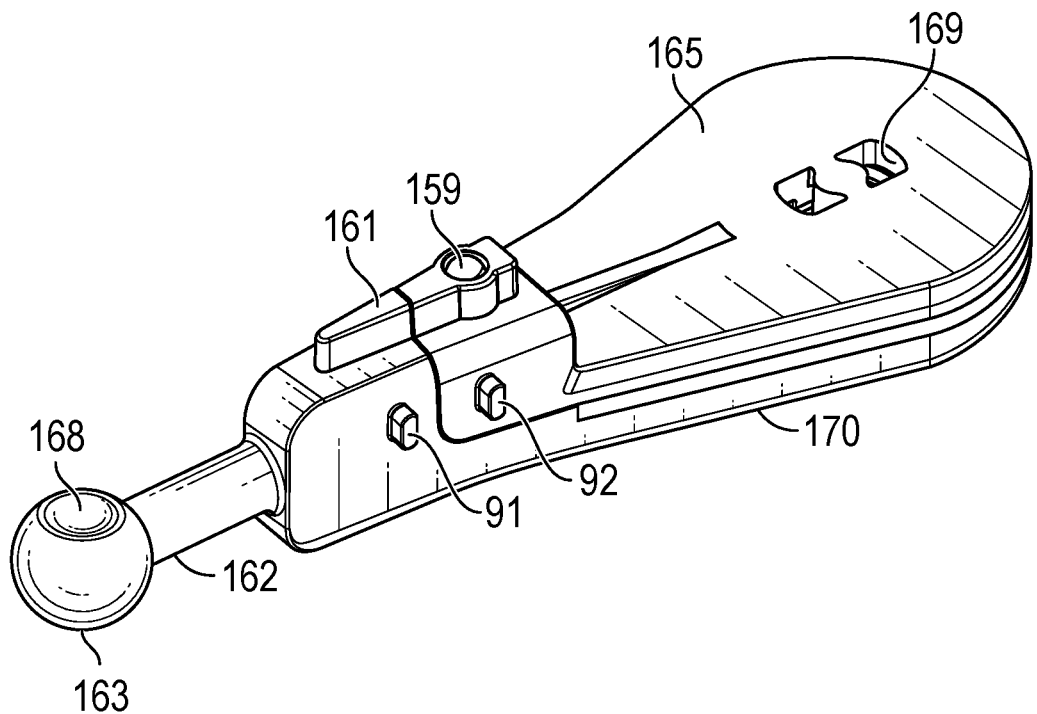
FIG. 21 shows another perspective view of a curtain attachment.
Figure 22:
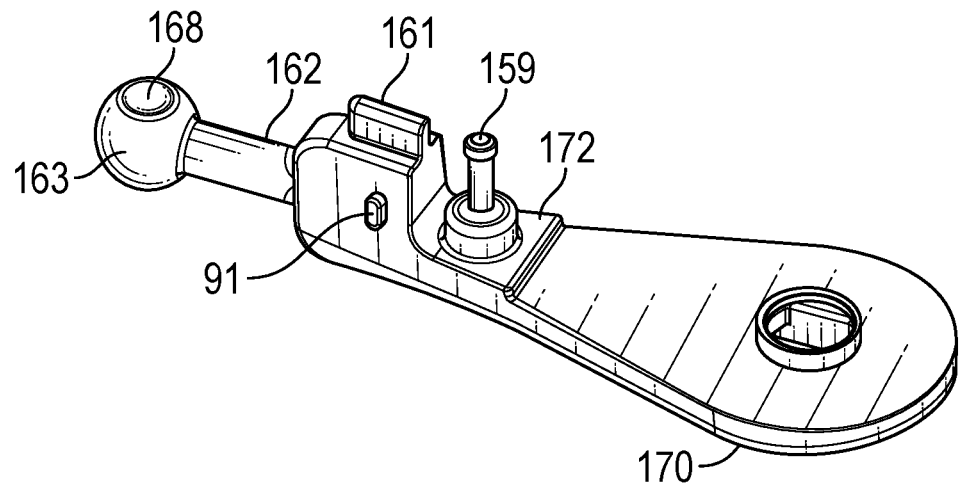
FIG. 22 shows a component of a curtain attachment.
Figure 23:
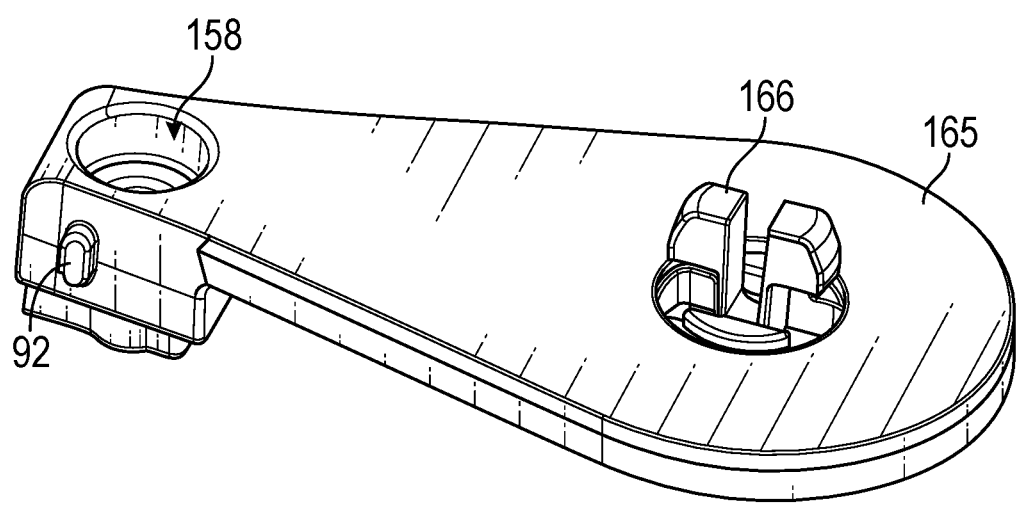
FIG. 23 shows another component of a curtain attachment.

FIGS. 8-11 shows the quick release and locking mechanism 149 having a body 150 for holding the head 163 of the curtain attachment. Referring to FIG. 8, the quick release body 150 has an upper side 300 and a lower side 302. The lower side has a slot 311 for receiving the neck (See 162 in FIGS. 20 and 21) of the curtain attachment. Openings 321 are shown which allow flexibility of the arms 322 (see FIG. 11). A cavity 325 is shown which matches protrusion 320 so that the quick release and locking mechanisms may match when in an array as shown in FIGS. 1 and 2. As show in FIGS. 8 and 9, the protrusion 320 is triangular and matches the triangular cavity 325. The locking mechanism 80 (see FIGS. 12 and 13) slides in a first sliding slot 380. Nibs 381 and 382 engage the catch 381. The handle 810 of the locking mechanism 80 assists in sliding the lock up and down. On the side of the handle 810 is a female opening 820 for receiving a male protrusion 821.

Figure 9:
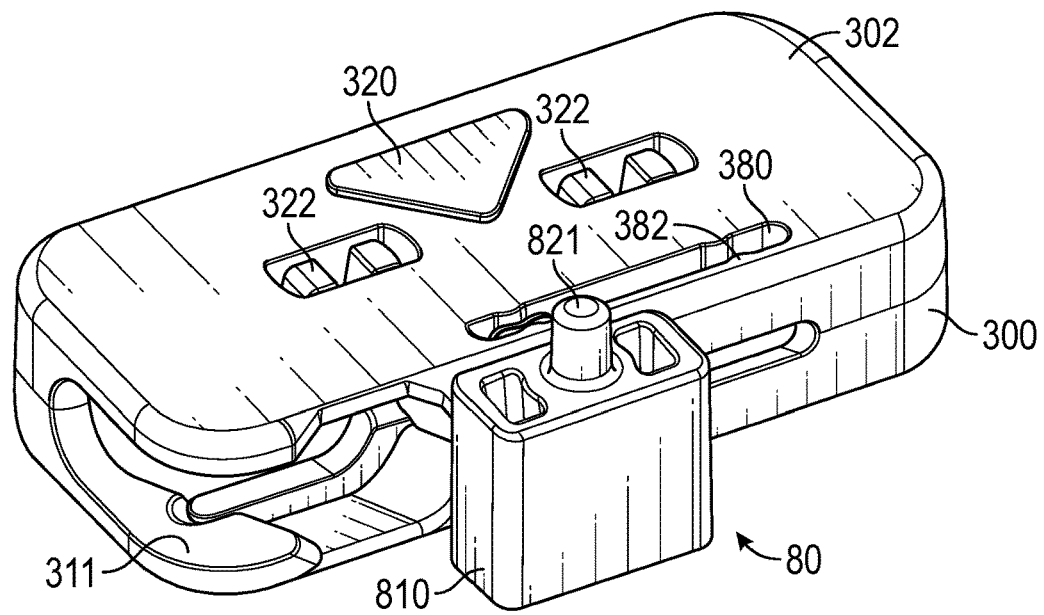
FIG. 9 shows a second perspective view of a quick release system according to an embodiment of the invention.

FIG. 9 shows the opposite side of the quick release locking mechanism shown in FIG. 8. On this side can be seen the male protrusions 821 on the handle 810 of the locking mechanism 80. Also, can be seen the protrusions 320. Arms 322 may be seen inside cavities which lock the two pieces together. The quick release locking mechanism may be made injection molding, machining or other manufacturing technics.

FIG. 10 shows a first side and an inside of a first side of the quick release and locking mechanism 149. Shown are the nibs 381 and 382 in the first sliding slot 380 for receiving the catch 831. The catch 831 slides along the first sliding slot 380. A second sliding slot 385 is also shown for receiving the forks 837, 836 of the locking mechanism 80. When the head 163 is in place at the base of the opening 310, the forks 837 and 836 may be slid into place. As the forks 837, 836 slide toward the neck receiving slot 311, the head 163 is locked into place. As the forks 837, 836 are moved away from the neck receiving slot 311 the head 163 may be removed. 151 shows the channel for receiving neck receiving opening 311, the head 163 can be removed. The channel opening or channel 151 is located on the side, front or back of the housing 150 so that when the head 163 is inserted it may be held in place by gravity. Cavity 319a is in place for receiving a magnet (not shown). The magnet assists in holding the array of quick release and locking mechanisms 149, 150 in place as shown in FIGS. 1 and 2. 321 shows an opening for locking arms 322 to hold a first side of the quick release body 150 to a second side of the quick release body 150. Alignment posts 304 assist in aligning the first side and second side of the body 150 together. 341 shows a channel for receiving a cable 133. Cavity 340 holds a swagged end of the cable in place.

FIG. 11 shows the second side of the body 150 of the quick release and locking mechanism 149. Shown are receiving openings 309 for receiving the alignment posts 304 for alignment of both sides of the body 150. The arms 322 for locking the two sides together are flexible so that the pieces may be snapped into place. This is so that the pieces may readily be assembled and disassembled for insertion and removal of the cable in channel 341 and swaged piece in 340. The arms 322 have a head with a catch 323. The arms 322 have a narrow section 324 for flexibility.

Figure 12:
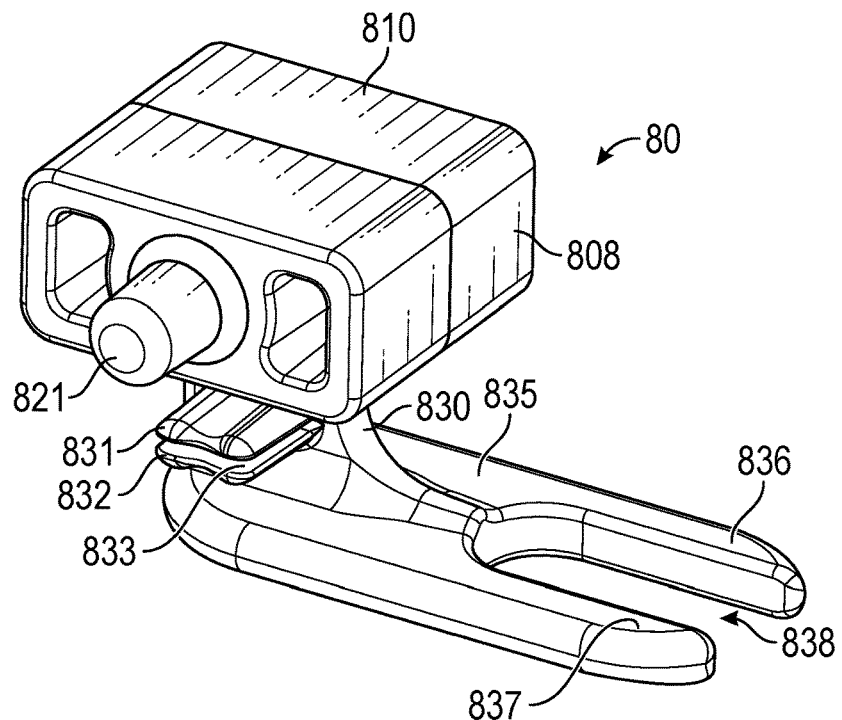
FIG. 12 shows a perspective view of a sliding lock used in a locking mechanism according to an embodiment of the invention.
Figure 13:
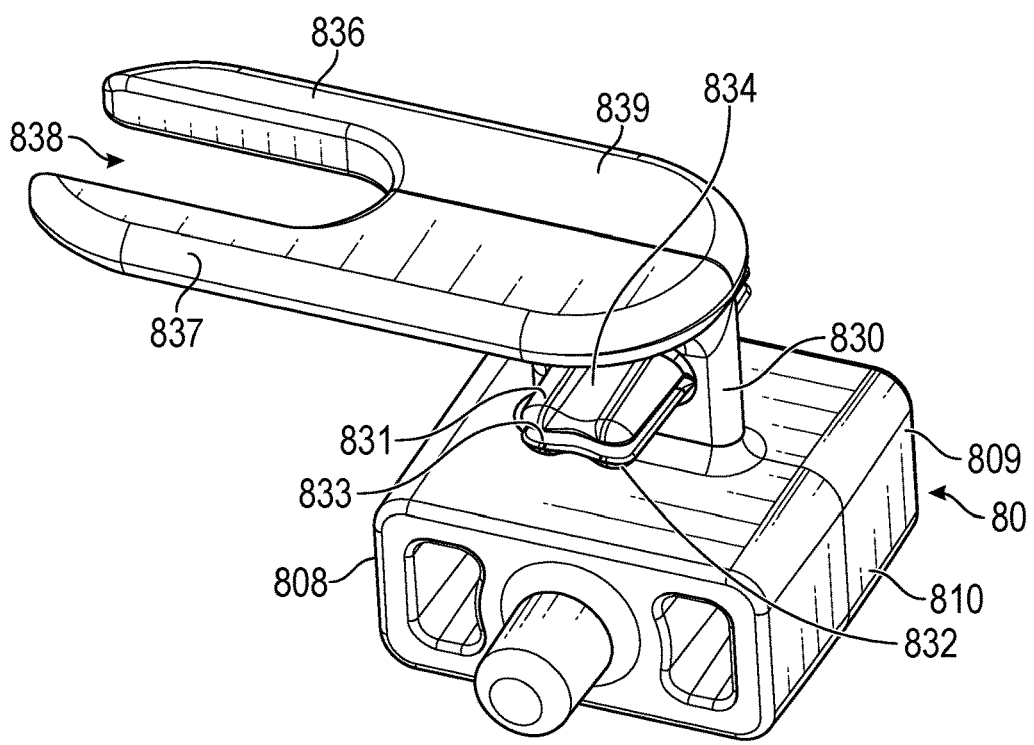
FIG. 13 shows another perspective view of a sliding lock used in a locking mechanism according to an embodiment of the invention.

FIGS. 12 and 13 show the locking mechanism 80. The locking mechanism has a forked base 835 with tines 836 and 837. The tines 836 and 837 having a curved end and are spaced apart. The base 835 and tines 836, 837 slide through the second sliding slot 385. The tines are spaced apart a distance 383 from each other. The spacing 838 is so that the neck 162 can have a greater degree of movement when installed. In the first sliding slot the catch 831 may slide through. The catch 831 is slotted at 833 and has a top and bottom part 832 so that it may flex when engaging the nibs 382 and 381. Alternatively, the catch may be solid for a firmer grip. The base 835 has a holder 830 for the handle 810 of the locking mechanism. The handle 810 has a lower face 808 and an upper face 809 so that it may be gripped by fingers. The base 835 has a lower face 839.

Figure 14:
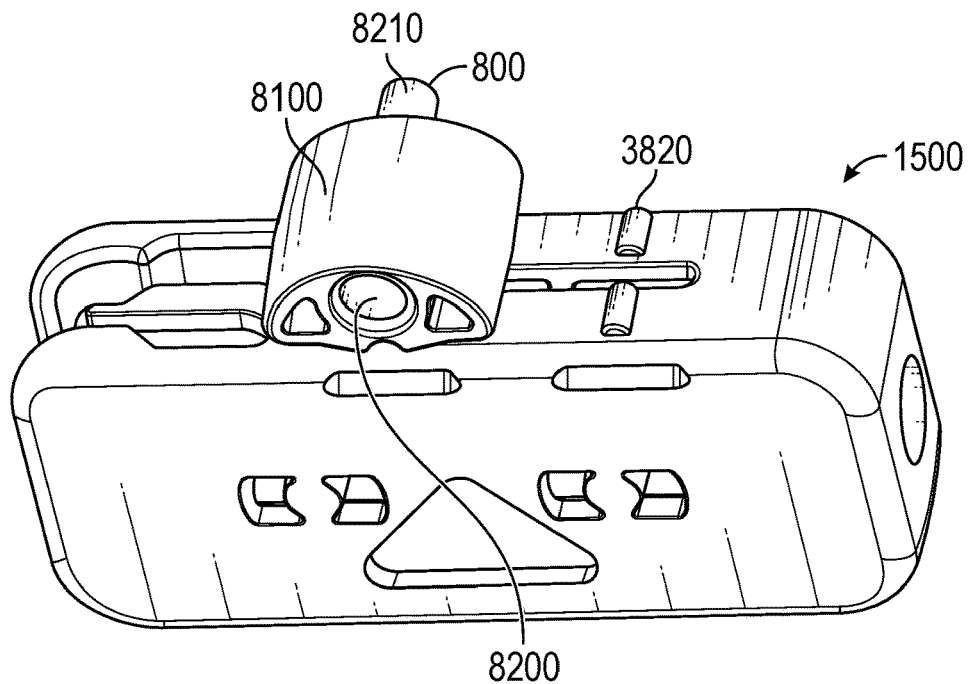
FIG. 14 shows a first perspective view of a quick release system according to another embodiment of the invention.
Figure 15:
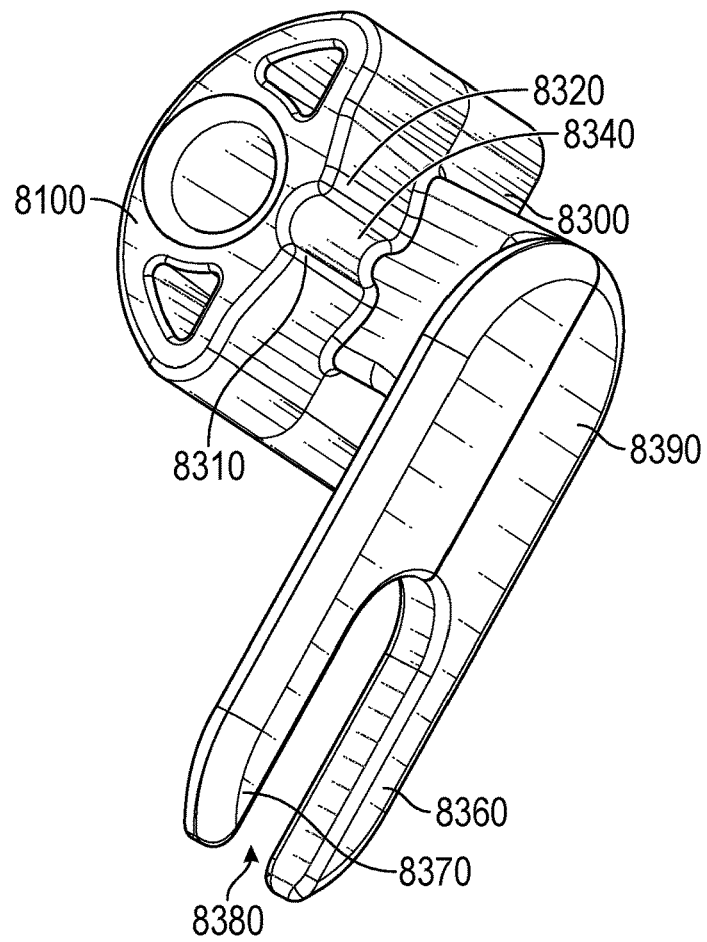
FIG. 15 shows a perspective view of a sliding lock used in a locking mechanism according to another embodiment of the invention.

Referring to FIGS. 14 and 15 is shown an alternative embodiment of the quick release and locking mechanism 800. In this embodiment only one sliding slot is used and the nibs 3820 are on the outside of the body 1500. The handle 8100 is curved. The handle has a catch 8340 which bumps 8310 and 8320. The base 8390 has a holder 8300 for the handle and times 8370 and 8360 with a gap 8380 for locking a head 163 in place.

Figure 16:
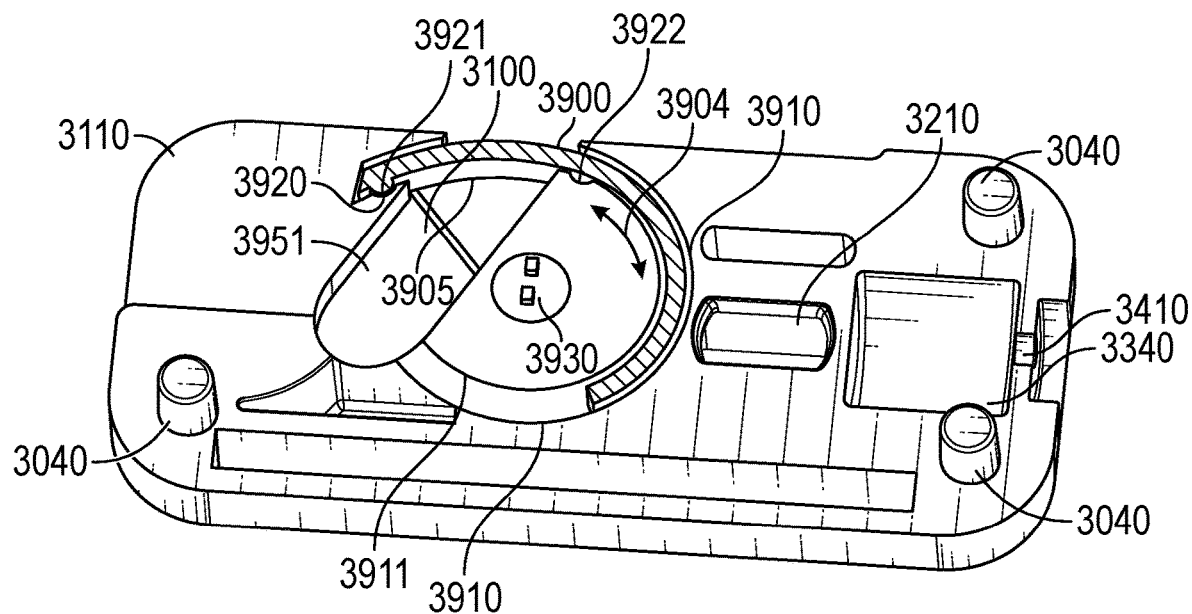
FIG. 16 shows a first side of the inside of a quick release system according to another embodiment of the invention.
Figure 17:
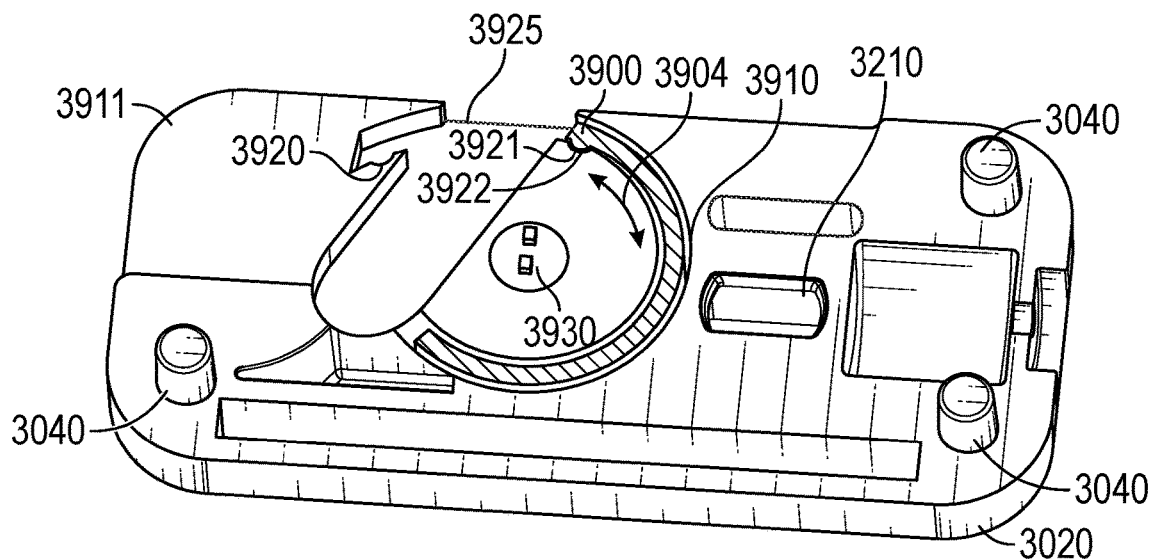
FIG. 17 shows a second side of the inside of a quick release system according to another embodiment of the invention.
Figure 18:
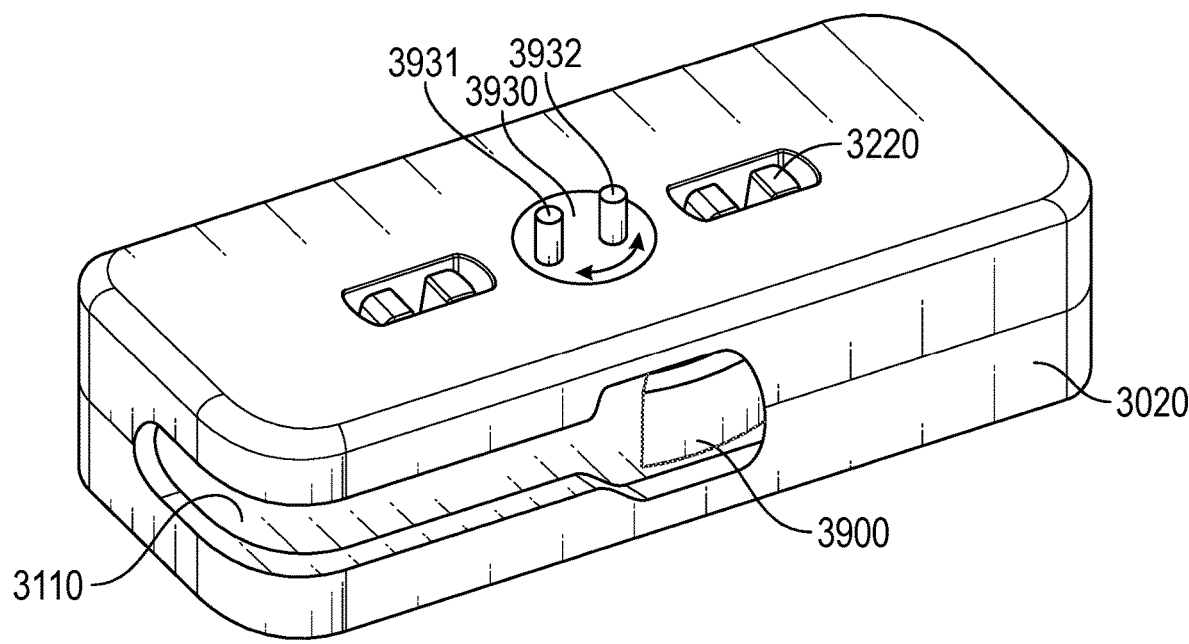
FIG. 18 shows a perspective view of a quick release system according to an embodiment of the invention.

FIGS. 16 through 18 show an alternative embodiment of the quick release and locking mechanism. In this embodiment the locking mechanism slide in a rotary fashion. The lock 3900 rotates 3904 within a housing 3910. The lock 3900 has an inside edge 3905 that slides/rotates along edge 3911. The lock 3900 is attached to a center piece 3930 which rotates by movement of the pins 3931 and 3932 which insert into corresponding holes (not shown) on the opposite side. When the quick release and locking mechanisms are all together in an array, they can be rotated all at once. The end of the lock 3900 has a nib 3921 that engages with a slot 3920. The neck 162 of the curtain attachment moves through the slot 3110. The head 163 is held in the slot 3951. Alignment posts 3040 may be inserted into corresponding holes/openings. Opening 3210 is used to receive arms to lock the two sides of the body together. The cable is received through the opening 3410 and swagged portion in the cavity 3340.

FIG. 16 shows the lock 3900 in a locked position and FIG. 17 shows the lock 3900 in an open position. Nib 3921 engages catch 3922. Arms 3220 extend for engagement with slot 3210.

Figure 19:
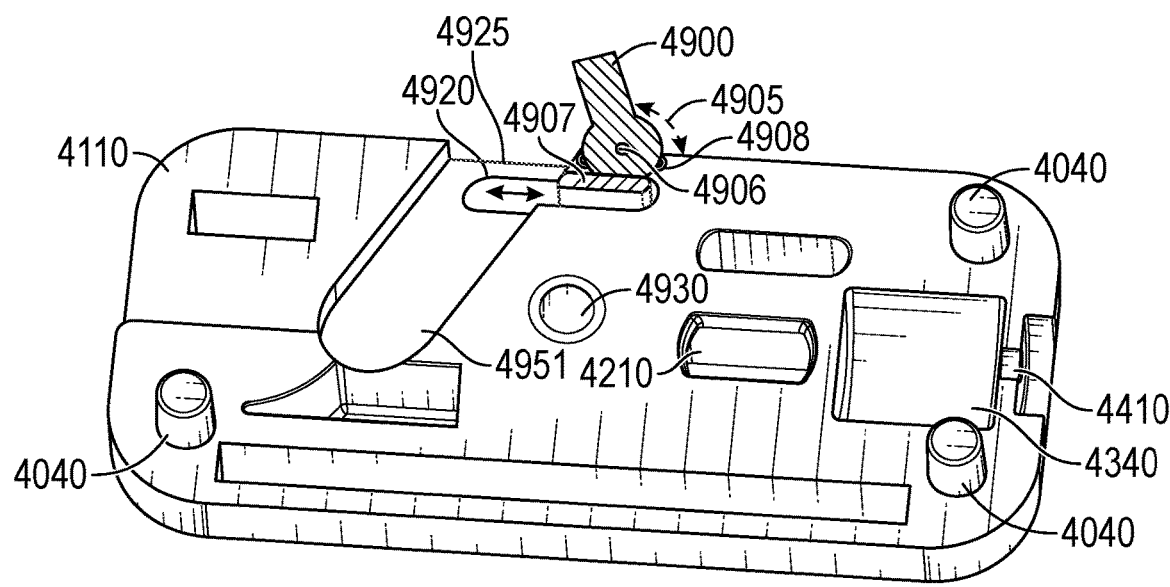
FIG. 19 shows a side of the inside of a quick release system according to another embodiment of the invention.

FIG. 19 shows another embodiment of the invention. In this embodiment, the lock is engaged with a switch 4900. The switch moves from locked to unlocked and vice versa by rotation 4905 of the switch 4900. The switch has a center point of rotation or pin 4906. The switch moves a slide 4907 through a slot 4920 in the channel 4925. The neck 162 of the curtain attachment moves through the slot 4110 and head 163 moves through the channel 4925. When the head 163 rests in the channel bottom 4951 it may be locked into place. The center has a magnet 4930. Alignment posts 4040 are used and cable receiver 4410 is also used.

With reference to FIGS. 20 through 23, a curtain attachment 160 is shown. The curtain attachment has a first piece 170 and a second piece 165. The first piece 170 has a head 163 with a flat part 168 and a neck 162. The flat part 168 of the head 163 is for guiding the head into the channel 151 in order to allow adequate clearance. The first piece 170 and second piece may be attached together with arms 166 and locking head 159. The locking head 159 goes into opening 158 to snap into place. Other forms of attachment may also be used such as adhesive, melting of plastic, etc. The curtain attachments 160 also include a guiding slot 167 and a protrusion 161 for alignment when the curtains an in an array. Projections 91 and 92 are to assist in aligning a twist wire (see FIG. 1) or an alignment tool 500 in FIGS. 25 and 26.

In addition to the above embodiments, it is envisioned that other types of sliding locking mechanism may be made. Sliding not only includes linear sliding, but also rotary sliding of parts.

With respect to FIG. 24, an extension 140 is shown which may be attached by cable 133 having a swagging 132 directly to the eyelet 123 of the hook 125 for the roller hook 120. The hook 125 has a shank 126, a bend 127 and a point 128. The area between the shank 126 and the point is the gap 129. In this manner, the hook attachment 130 may be eliminated, or be used for other purposes such as attaching an upper mesh.

In an alternate embodiment shown in FIG. 25, the hook attachment 130 is also eliminated. An extension 1140 is shown. The extension 1140 may be any rod made of nylon, acrylic or other polymer or composite material. A clip, clasp or other attachment 1133 is shown which attaches directly to the roller hook 120. In addition, it is envisioned that the eyelet may be eliminated and replaced by a nipple 1123. The nipple 1123 may be secured by glue, epoxy or the like. The nipple 1123 may also include barbs or protrusions 1123 which may engage with openings 1126 on the extension 1140.

Figure 26:
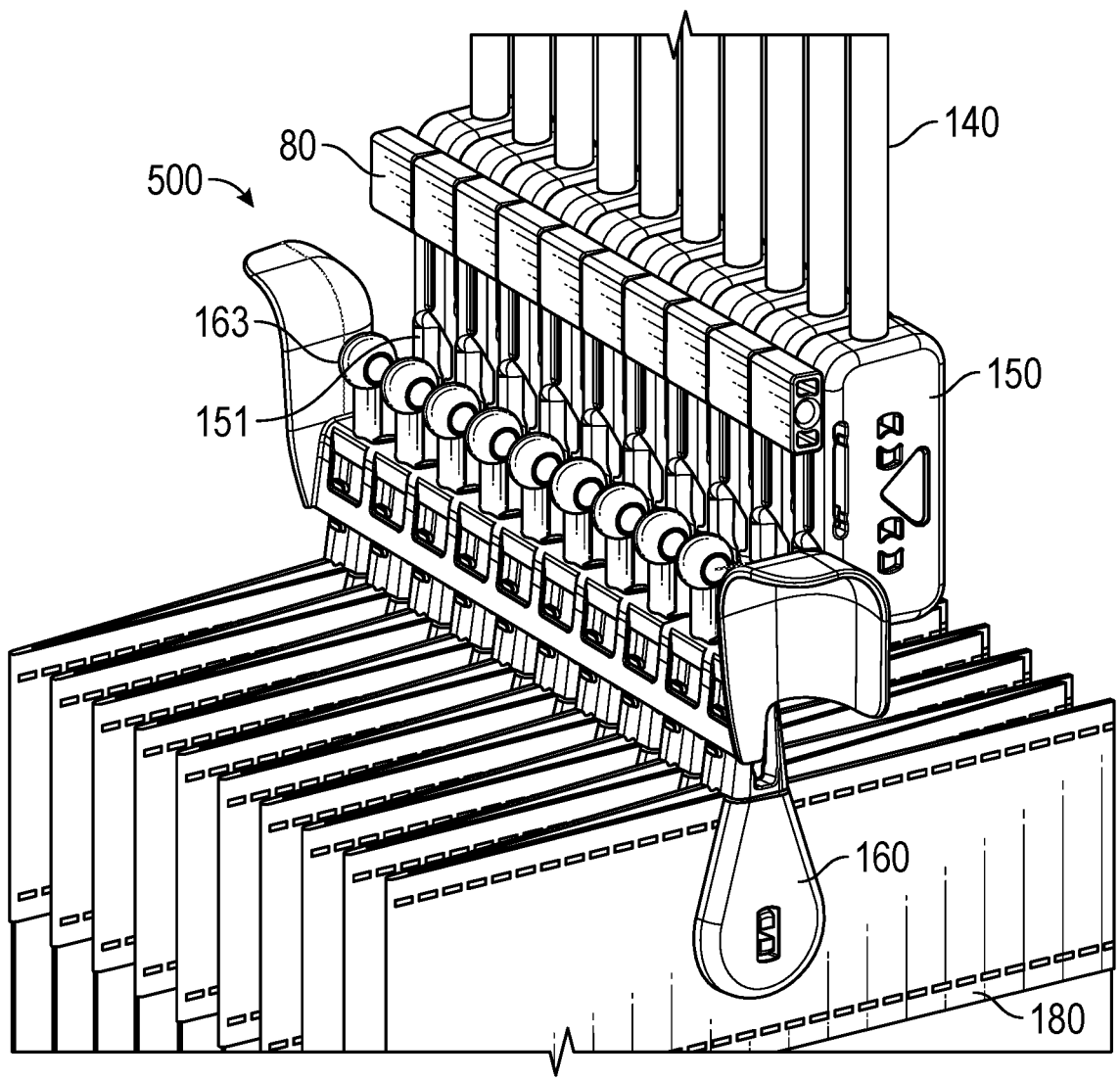
FIG. 26 shows a holder for the curtain attachments in operation.
Figure 27:
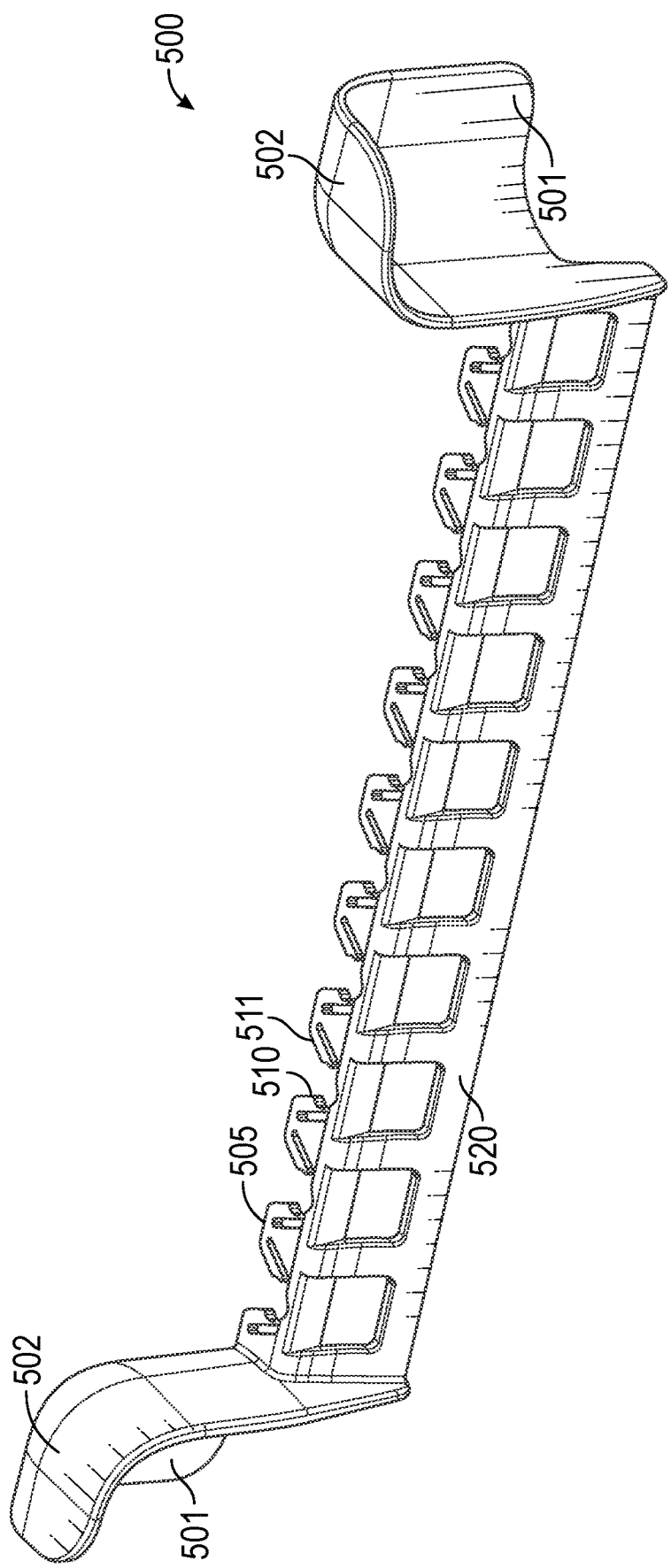
FIG. 27 shows the holder.

FIGS. 26 and 27 show a retainer or guide for holding the curtain attachments together and for guiding them into the quick-release. FIG. 26 shows the retainer or guide 500 for holding the curtain holders 160 so the that the head 163 may be directed into the channel 151 prior to locking mechanism 80 being slid into place for locking the heads 163 into the quick release 150. FIG. 27 shows the quick release 150. Each end of the quick release 500 includes a thumb holder 502. A user's thumbs may engage with the holder at 501 to slide the curtain holders 160 into the quick release 150. Each retainer or guide has holders 505 with barbs 510 and 511 for holding the neck 162 of the curtain holder 160.

Referring to FIGS. 1 and 26 a method for attaching a disposable curtain system 100 is disclosed providing a hook and/or roller attachment 130, 1133, 1123;

providing an extension 140, operatively attached to the hook and/or roller attachment 130, 1133, 1123;

providing a quick-release 150, having an extension attachment operatively attached to the extension;

attaching a curtain attachment 160 of the quick-release 150 to the curtain 180, wherein at least one of the curtain attachment 160 and the extension attachment has a neck 162 and a head 163 and the other of the curtain attachment and the extension attachment has at a base of an opening 310 at least one of a cradle or receiver 150 for receiving the head 163;

inserting the head 163 into an opening in the second portion 151 of the quick-release and allowing the head to drop into the base of the opening 310; and locking the head within the base of the opening 310, wherein a locking mechanism 80 is configured to move to at least partially cover the opening 151 of the at least one of a cradle or receiver.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

What is claimed is:

1. A quick-release system for use with a curtain system comprising:

a cradle or receiver;

a curtain attachment having an insert for cooperating with the cradle or receiver; and a sliding locking mechanism, wherein the locking mechanism has a handle that may be gripped and slid by fingers and is located on the cradle or receiver for locking the insert into the cradle or receiver.

2. The quick-release system for use with the curtain system of claim 1, wherein the insert includes a neck and a head on a first side and a curtain engagement on the other side and wherein a lower portion of the head proximate the neck rests in the cradle or receiver when in use.

3. The quick-release system for use with the curtain system of claim 2, wherein the curtain attachment includes a protruding alignment member on a first side and a receiving alignment member on a second side.

4. The quick-release system for use with the curtain system of claim 3, wherein the protruding member has a geometric shape that matches the receiving alignment member.

5. The quick-release system for use with the curtain system of claim 2, wherein the protruding member is triangular that matches the receiving alignment member which is a triangular opening.

6. The quick-release system for use with the curtain system of claim 1, wherein the cradle or receiver includes a housing for receiving the head in the housing, said at least one of the cradle or said receiver having a first portion of an opening for receiving the head and second portion of the opening for holding the head.

7. The quick-release system for use with the curtain system of claim 1, wherein the sliding locking mechanism is on a front, back or side of the cradle or receiver.

8. The quick-release system for use with the curtain system of claim 1, wherein an extension attachment includes a housing, said housing having at least one protrusion for alignment on a first side and at least one indention for alignment on an opposite side of the housing.

9. The quick-release system for use with the curtain system of claim 1, wherein the curtain system is disposable.

10. The quick-release system for use with the curtain system of claim 1, wherein the locking system has nibs and a catch.

11. The quick-release system for use with the curtain system of claim 10, wherein the nibs and catch are in a slot.

12. The quick-release system for use with the curtain system of claim 1, wherein the locking system has flexible slot.

13. The quick release system for use with a curtain system of claim 1, wherein the locking mechanism handle may engage with other locking mechanism handles when in an array.

14. The quick release system for use with a curtain system of claim 13, wherein the locking mechanism handle has a protrusion on one side and a cavity on the other side for engaging with other locking mechanism handles when in an array.

\* \* \* \* \*